(12) United States Patent
Hoydis et al.

(10) Patent No.: US 11,968,040 B2
(45) Date of Patent: Apr. 23, 2024

(54) GRAPH NEURAL NETWORK FOR CHANNEL DECODING

(71) Applicant: NVIDIA Corporation, Santa Clara, CA (US)

(72) Inventors: Jakob Hoydis, Paris (DE); Sebastian Cammerer, Tuebingen (DE); Faycal Ait Aoudia, Saint-Cloud (FR); Alexander Keller, Berlin (DE)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 18/118,637

(22) Filed: Mar. 7, 2023

(65) Prior Publication Data

US 2023/0403100 A1 Dec. 14, 2023

Related U.S. Application Data

(60) Provisional application No. 63/352,171, filed on Jun. 14, 2022.

(51) Int. Cl.
*H04L 1/00* (2006.01)
*G06N 3/04* (2023.01)
*G06N 3/042* (2023.01)

(52) U.S. Cl.
CPC .............. *H04L 1/0054* (2013.01); *G06N 3/04* (2013.01); *G06N 3/042* (2023.01); *H04L 1/0057* (2013.01)

(58) Field of Classification Search
CPC ....... H04L 1/0054; H04L 1/0057; G06N 3/04; G06N 3/042; G06N 3/0455; G06N 3/084
See application file for complete search history.

(56) References Cited

U.S. PATENT DOCUMENTS

2009/0245426 A1* 10/2009 Ratnakar ............... H04L 1/0045
714/751
2017/0126360 A1* 5/2017 Millar ................... H04L 1/0057
(Continued)

OTHER PUBLICATIONS

S. Cammerer, J. Hoydis, F. A. Aoudia and A. Keller, "Graph Neural Networks for Channel Decoding," 2022 IEEE Globecom Workshops (GC Wkshps), Rio de Janeiro, Brazil, 2022, pp. 486-491 (Year: 2022).*

(Continued)

*Primary Examiner* — Cynthia Britt
(74) *Attorney, Agent, or Firm* — Zilka-Kotab, P.C.

(57) ABSTRACT

Various embodiments and implementations of graph-neural-network (GNN)-based decoding applications are disclosed. The GNN-based decoding schemes are broadly applicable to different coding schemes, and capable of operating on both binary and non-binary codewords, in different implementations. Advantageously, the inventive GNN-based decoding is scalable, even with arbitrary block lengths, and not subject to typical limits with respect to dimensionality. Decoding performance of the inventive GNN-based techniques demonstrably matches or outpaces BCH and LDPC (both regular and 5G NR) decoding algorithms, while exhibiting improvements with respect to number of iterations required and scalability of the GNN-based approach. These inventive concepts are implemented, according to various embodiments, as methods, systems, and computer program products.

26 Claims, 14 Drawing Sheets

(56) References Cited

U.S. PATENT DOCUMENTS

2021/0241067 A1* 8/2021 Nachmani ............ H03M 13/152
2023/0189317 A1* 6/2023 Narasimha Swamy ......................
G06N 3/044
370/329

OTHER PUBLICATIONS

Kschischang et al., "Factor Graphs and the Sum-Product Algorithm," IEEE Transactions on Information Theory, vol. 47, No. 2, Feb. 2001, pp. 498-519.

Chung et al., "On the Design of Low-Density Parity-Check Codes within 0.0045 dB of the Shannon Limit," IEEE Communications letters, vol. 5, No. 2, Feb. 2001, pp. 58-60.

Arikan, E., "Channel Polarization: A Method for Constructing Capacity-Achieving Codes for Symmetric Binary-Input Memoryless Channels," IEEE Transactions on Information Theory, vol. 55, No. 7, Jul. 2009, pp. 3051-3073.

Kudekar et al., "Spatially Coupled Ensembles Universally Achieve Capacity under Belief Propagation," IEEE Transactions on Information Theory, vol. 59, No. 12, 2012, pp. 7761-7813.

Pearl, J., "Reverend bayes on inference engines: A distributed hierarchical approach," AAAI Proceedings, 1982, pp. 133-136.

Schmid et al., "Low-Complexity Near-Optimum Symbol Detection Based on Neural Enhancement of Factor Graphs," IEEE Transactions on Communications, vol. 70, No. 11, Nov. 2022, pp. 7562-7575.

Liva et al., "Code Design for Short Blocks: A Survey," arXiv, 2016, 6 pages, retrieved from https://arxiv.org/pdf/1610.00873.pdf.

Cammerer et al., "Sparse Graphs for Belief Propagation Decoding of Polar Codes," IEEE International Symposium on Information Theory, Jun. 2018, 6 pages.

Geiselhart et al., "Automorphism Ensemble Decoding of Reed-Muller Codes," IEEE Transactions on Communications, Jul. 2021, 17 pages.

Honkala et al., "DeepRx: Fully Convolutional Deep Learning Receiver," IEEE Transactions on Wireless Communications, May 2020, pp. 1-30, retrieved from https://www.semanticscholar.org/paper/DeepRx%3A-Fully-Convolutional-Deep-Learning-Receiver-Honkala-Korpi/5ce648610d59e555c1d3f5f9f5aead102e618cc7.

Nachmani et al., "Learning to Decode Linear Codes Using Deep Learning," IEEE, 2016, 7 pages, retrieved from https://www.researchgate.net/publication/305401716_Learning_to_Decode_Linear_Codes_Using_Deep_Learning.

O'Shea et al., "An Introduction to Deep Learning for the Physical Layer," IEEE Transactions on Cognitive Communications and Networking, Feb. 2017, pp. 1-13, retrieved from https://www.semanticscholar.org/paper/An-Introduction-to-Deep-Learning-for-the-Physical-O'Shea-Hoydis/78989616eeeac55b202e3e4205225e7135054185.

Cammerer et al., "Trainable communication systems: Concepts and prototype," IEEE Transactions on Communications, Nov. 2019, 14 pages, retrieved from https://www.semanticscholar.org/paper/Trainable-Communication-Systems%3A-Concepts-and-Cammerer-Aoudia/009d3cf5ac59899fa85c44acf44b0078daf4ea23.

Satorras et al., "Neural Enhanced Belief Propagation on Factor Graphs," Proceedings of the 24th International Conference on Artificial Intelligence and Statistics (AISTATS), vol. 130, 2021, 10 pages.

Gruber et al., "On Deep Learning-Based Channel Decoding," IEEE 51st Annual Conference on Information Sciences and Systems, 2017, 7 pages.

Bennatan et al., "Deep Learning for Decoding of Linear Codes—A Syndrome-Based Approach," IEEE International Symposium on Information Theory (ISIT), 2018, 8 pages, retrieved from https://www.semanticscholar.org/paper/Deep-Learning-for-Decoding-of-Linear-Codes-A-Bennatan-Choukroun/1fc7eb2b08fdd63733330b0c5c3bf91f6fc40cd3.

Choukroun et al., "Error Correction Code Transformer," arXiv, 2022, 11 pages, retrieved from https://aps.arxiv.org/pdf/2203.14966.pdf.

Hoydis et al., "Sionna: An Open-Source Library for Next-Generation Physical Layer Research," arXiv, 2022, 5 pages, retrieved from https://arxiv.org/pdf/2203.11854v1.pdf.

Ryan, W., "An Introduction to LDPC Codes," Aug. 19, 2003, 23 pages, retrieved from http://tuk88.free.fr/LDPC/idpcchap.pdf.

Buchberger et al., "Pruning and Quantizing Neural Belief Propagation Decoders," IEEE Journal on Selected Areas in Communications, Nov. 2020, pp. 1-10, retrieved from https://www.semanticscholar.org/paper/Pruning-and-Quantizing-Neural-Belief-Propagation-Buchberger-H%C3%A4ger/2c274f7220f2a70460d45f090d3eb0e8dc706ced.

Donoho et al., "High-dimensional data analysis: The curses and blessings of dimensionality," AMS math challenges lecture, Jan. 2000, 34 pages.

Glorot et al., "Understanding the difficulty of training deep feedforward neural networks," Proceedings of the 13th International Conference on Artificial Intelligence and Statistics (AISTATS), 2010, pp. 249-256.

Github, "Tiny CUDA neural network," GitHub, 2022, 13 pages, retrieved from https://github.com/nvlabs/tiny-cuda-nn.

Forney et al., "Codes on graphs: Normal realizations," IEEE Transactions on Information Theory, vol. 47, No. 2, Feb. 2001, pp. 520-548.

Richardson et al., "Modern coding theory," Cambridge University Press, Oct. 18, 2007, 590 pages.

Wang et al., "An Artificial Neural Net Viterbi Decoder," IEEE Transactions on Communications, vol. 44, No. 2, Feb. 1996, pp. 165-171.

Tanner, M, "A Recursive Approach to Low Complexity Codes," IEEE Transactions on Information Theory, vol. 27, No. 5, Sep. 1981, pp. 533-547.

Gallager, R., "Low-density parity-check codes," Cambridge, Mass., 1963, 90 pages.

* cited by examiner

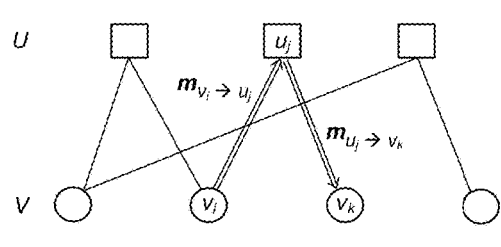

$$m_{v_i \to u_j} = f^{F_m}\left(\left[h_{v_i} \| h_{u_j} \| g_{m_{v_i \to u_j}}\right], \theta_{m_{v \to u}}\right)$$

$$m_{u_j \to v_i} = f^{F_m}\left(\left[h_{u_j} \| h_{v_i} \| g_{m_{u_j \to v_i}}\right], \theta_{m_{u \to v}}\right)$$

$$h'_{u_j} = f^{F_n}\left(\left[h_{u_j} \| \frac{1}{|\mathcal{V}(u_j)|} \sum_{v_i \in \mathcal{V}(u_j)} m_{v_i \to u_j} \| g_{u_j}\right], \theta_u\right)$$

$$h'_{v_i} = f^{F_n}\left(\left[h_{v_i} \| \frac{1}{|\mathcal{U}(v_i)|} \sum_{u_j \in \mathcal{U}(v_i)} m_{u_j \to v_i} \| g_{v_i}\right], \theta_v\right)$$

*Fig. 7*

Algorithm 1: GNN-based Decoding Algorithm

Input : LLRs of the (noisy) channel observations $\ell_{ch}$
Set of trainable parameters:
- FN updates $\theta_u$
- VN updates $\theta_v$
- Variable to factor message updates $\theta_{m_{v \to u}}$
- Factor to variable message updates $\theta_{m_{u \to v}}$
- VN attributes $\{g_{v_i}\} \forall v_i \in \mathcal{V}$
- FN attributes $\{g_{u_j}\} \forall u_j \in \mathcal{U}$
- Msg. attr. $\{g_{m_{v_i \to u_j}}, g_{m_{u_j \to v_i}}\}, \forall (v_i, u_j) \in \mathcal{E}$
- Input embedding $\mathbf{w}$
- Output embedding $\mathbf{q}$

Output: Soft estimates $\ell$ of the codeword bits $\mathbf{c}$

1 % Initialize graph nodes
2 For $v_i \in \mathcal{V}$
3     $\mathbf{h}_{v_i} \leftarrow \ell_{ch,i} \cdot \mathbf{w}$
4 $\mathbf{h}_u \leftarrow 0$
5 % Run decoding iterations
6 For $it = 0, \ldots, N_{iter} - 1$ do
7     % Update variable to factor node messages
8     For $(v_i, u_j) \in \mathcal{E}$
9       $\mathbf{m}_{v_i \to u_j} \leftarrow f^{F_m}([\mathbf{h}_{v_i}||\mathbf{h}_{u_j}||g_{v_i \to u_j}], \theta_{m_{v \to u}})$
10     % Update factor nodes
11     For $u_j \in \mathcal{U}$
12       $\mathbf{h}_{u_j} \leftarrow$
$f^{F_u}([\mathbf{h}_{u_j}||\frac{1}{|\mathcal{V}(u_j)|}\sum_{v_i \in \mathcal{V}(u_j)} \mathbf{m}_{v_i \to u_j}||g_{u_j}], \theta_u)$
13     % Update factor to variable node messages
14     For $(v_i, u_j) \in \mathcal{E}$
15       $\mathbf{m}_{u_j \to v_i} \leftarrow f^{F_m}([\mathbf{h}_{u_j}||\mathbf{h}_{v_i}||g_{u_j \to v_i}], \theta_{m_{u \to v}})$
16     % Update variable nodes
17     For $v_i \in \mathcal{V}$
18       $\mathbf{h}_{v_i} \leftarrow$
$f^{F_v}([\mathbf{h}_{v_i}||\frac{1}{|\mathcal{U}(v_i)|}\sum_{u_j \in \mathcal{U}(v_i)} \mathbf{m}_{u_j \to v_i}||g_{v_i}], \theta_v)$
19 end
20 % Project variable node values back to scalar LLRs
21 For $v_i \in \mathcal{V}$
22     $\ell_i \leftarrow \mathbf{q}^t \mathbf{h}_{v_i}$
23 return $\ell = [\ell_0, \ldots, \ell_{n-1}]$

*Fig. 8*

Algorithm 2: GNN-based Decoding Algorithm for Non-binary Codes

Input : Probability vectors $p_{ch}(c_k|y_k) \in [0,1]^q$ for each transmitted codeword symbol $c_k$
Set of trainable parameters:
- FN updates $\theta_u$
- VN updates $\theta_v$
- Variable to factor message updates $\theta_{m_{v \to u}}$
- Factor to variable message updates $\theta_{m_{u \to v}}$
- VN attributes $\{g_{v_i}\} \forall v_i \in \mathcal{V}$
- FN attributes $\{g_{u_j}\} \forall u_j \in \mathcal{U}$
- Msg. attr. $\{g_{m_{v_i \to u_j}}, g_{m_{u_j \to v_i}}\}, \forall (v_i, u_j) \in \mathcal{E}$
- Input transformation $\mathbf{W} \in \mathbb{R}^{F_n \times q}$
- Output transformation $\mathbf{Q} \in \mathbb{R}^{q \times F_n}$

Output: Estimated symbol probabilities vectors $\hat{p}(c_k|y)$ for each codeword symbol of $c$, i.e., a matrix $\hat{\mathbf{P}} \in [0,1]^{q \times n}$.

1 % Initialize graph nodes
2 For $v_i \in \mathcal{V}$
3  $\quad \mathbf{h}_{v_i} \leftarrow \mathbf{W} \cdot p_{ch}(c_i|y_i)$
4 $\mathbf{h}_{u_j} \leftarrow 0$
5 % Run decoding iterations
6 For $it = 0, \ldots, N_{iter} - 1$ do
7 $\quad$ % Update variable to factor node messages
8 $\quad$ For $(v_i, u_j) \in \mathcal{E}$
9 $\quad\quad \mathbf{m}_{v_i \to u_j} \leftarrow f^{F_m}([\mathbf{h}_{v_i}||\mathbf{h}_{u_j}||g_{v_i \to u_j}], \theta_{m_{v \to u}})$
10 $\quad$ % Update factor nodes
11 $\quad$ For $u_j \in \mathcal{U}$
12 $\quad\quad \mathbf{h}_{u_j} \leftarrow$
$\quad\quad\quad f^{F_n}([\mathbf{h}_{u_j}|| \frac{1}{|\mathcal{V}(u_j)|} \sum_{v_i \in \mathcal{V}(u_j)} \mathbf{m}_{v_i \to u_j}||g_{u_j}], \theta_u)$
13 $\quad$ % Update factor to variable node messages
14 $\quad$ For $(v_j, u_j) \in \mathcal{E}$
15 $\quad\quad \mathbf{m}_{u_j \to v_i} \leftarrow f^{F_m}([\mathbf{h}_{u_j}||\mathbf{h}_{v_i}||g_{u_j \to v_i}], \theta_{m_{u \to v}})$
16 $\quad$ % Update variable nodes
17 $\quad$ For $v_i \in \mathcal{V}$
18 $\quad\quad \mathbf{h}_{v_i} \leftarrow$
$\quad\quad\quad f^{F_n}([\mathbf{h}_{v_i}|| \frac{1}{|\mathcal{U}(v_i)|} \sum_{u_j \in \mathcal{U}(v_i)} \mathbf{m}_{u_j \to v_i}||g_{v_i}], \theta_v)$
19 end
20 % Project variable node values back to probability vectors
21 For $v_i \in \mathcal{V}$
22 $\quad \hat{p}_i(c_i|y) \leftarrow \text{softmax}(\mathbf{Q}\mathbf{h}_{v_i})$
23 return $\hat{\mathbf{P}} = [\hat{p}_0(c_0|y), \ldots, \hat{p}_{n-1}(c_{n-1}|y)]$

*Fig. 12*

GRAPH NEURAL NETWORK FOR CHANNEL DECODING

CLAIM OF PRIORITY

This application claims the benefit of U.S. Provisional Application No. 63/352,171 titled "GRAPH NEURAL NETWORK FOR CHANNEL DECODING," filed Jun. 14, 2022, the entire contents of which is incorporated herein by reference.

TECHNICAL FIELD

The present disclosure relates to channel decoding in a communication system. In particular, the inventive concepts presented herein relate to graph neural network (GNN)-based frameworks for channel decoding, especially for wireless and optical communication systems.

BACKGROUND

In general, communication systems, such as wireless/optical communication systems, rely on various coding schemes, such as low-density parity-check (LDPC), Polar, and Bose-Chaudhuri-Hocquenghem (BCH) codes. Accordingly, channel decoding is used for these communication systems to reconstruct the originally transmitted bit sequence from the received (noisy) messages. Current decoding solutions include belief propagation (BP) or successive-cancellation list (SCL) decoding.

For short to intermediate codeword lengths, the decoding performance under BP decoding shows a nonnegligible gap when compared to the optimal maximum-likelihood decoding for most codes. For this regime, no universal and low-complexity coding scheme is currently available as for BP decoding either the decoding graph becomes dense (as, e.g., the case for Polar decoding) or the decoding graph has many short cycles. For Polar codes, SCL decoding achieves the best performance, but at the cost of very high complexity.

In addition, known deep learning (DL)-based channel decoding techniques lack scalability, particularly to arbitrary block lengths, and training is typically limited by the curse of dimensionality.

Further still, the use of non-binary codes requires carefully adjusted conventional channel decoders which are characterized by a high computational complexity and high engineering complexity. In particular, there is a lack of efficient decoding algorithms for processing of soft information (i.e., log-likelihood ratios (LLRs) or probabilities that a bit is "0" or "1" and symbol probabilities for non-binary symbols, respectively) for non-binary codes. This restricts most practical applications to binary schemes.

There is a need for addressing these issues and/or other issues associated with the prior art. For example, there is a need for a universal decoding architecture that can decode Polar, LDPC, and BCH codes in the same hardware engine, which would, among other advantages, simplify the chip design of future wireless systems.

SUMMARY

According to one aspect, a method includes, at a device: receiving one or more codewords of a linear block code; embedding the one or more received codewords into a higher-dimensional space; and decoding the embedded codeword(s) using a graph neural network (GNN)-based decoder trained to decode linear block codes of arbitrary block length.

According to another aspect, a system includes: a non-transitory memory storage comprising instructions; and one or more processors in communication with the memory, wherein the one or more processors execute the instructions to: receive one or more codewords of a linear block code; embed the one or more received codewords into a higher-dimensional space; and decode the embedded codewords using a graph neural network (GNN)-based decoder trained to decode linear block codes of arbitrary block length.

According to yet another aspect, a on-transitory computer readable media storing computer instructions which, when executed by one or more processors of a device, cause the device to: receive codewords of a linear block code; embed the received codewords into a higher-dimensional space; and decode the said embedded codewords using a graph neural network (GNN)-based decoder trained to decode linear block codes of arbitrary block length.

Further details of aspects, objectives, and advantages of the technological aspects are described herein, and in the drawings and claims.

BRIEF DESCRIPTION OF THE DRAWINGS

FIG. 7 depicts an exemplary message passing graph neural network (GNN)-based bipartite graph, according to certain implementations of the inventive concepts presented in this disclosure.

FIG. 8 depicts an exemplary algorithm for graph neural network (GNN)-based decoding, according to various aspects of the presently described inventive concepts.

FIG. 11A illustrates the impact of varying code rate, while FIG. 11B illustrates the impact of varying length, again according to exemplary embodiments.

FIG. 12 shows an exemplary algorithm for graph neural network (GNN)-based decoding in the context of non-binary coding schemes, according to an aspect of the presently described inventive concepts.

DETAILED DESCRIPTION

Figure 1:
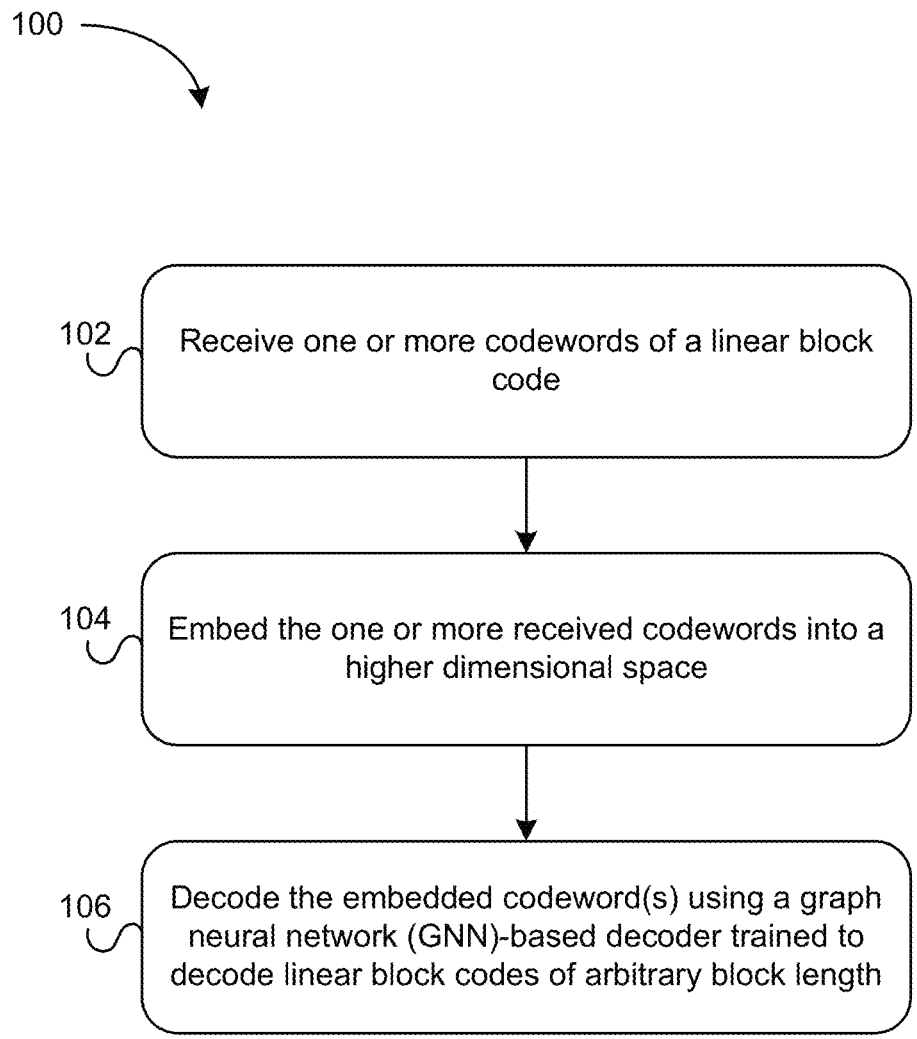
FIG. 1 illustrates a method for channel decoding using a graph neural network (GNN)-based decoder, in accordance with one embodiment of the inventive concepts described herein.

The presently described inventive concepts relate to fully differentiable graph neural network (GNN)-based architectures particularly useful in the context of channel decoding. The inventive architectures are trained to learn a generalized message passing algorithm over a given graph, which may represent, e.g., a forward error correction (FEC) code structure by replacing node and message updates with trainable functions.

Codes on graphs have recently gained attention in the context of modern forward error correction (FEC) schemes and have, thereby, brought the theoretical asymptotic performance limits of channel coding within practical reach. As a result, many practical coding schemes in today's wireless communication systems can be interpreted as (sparse) graphs which inherently provide a low-complexity, iterative message passing decoder—namely, belief propagation (BP) decoding. However, when focusing on short to intermediate codeword lengths, the decoding performance under BP decoding shows a non-negligible gap when compared to maximum likelihood (ML) decoding for most codes. For this regime, there is still no universal iterative coding scheme as either the decoding graph becomes dense (e.g., for Polar decoding) and/or the decoding graph has many short cycles.

Similarly, the field of deep learning for communications has rapidly progressed and showcased several impressive results ranging from fully neural network (NN)-based orthogonal frequency division multiplexing (OFDM) receivers to weighted BP decoding. However, there is still no structured way of embedding a known graph (or data) structure in current deep learning architectures. Deep learning for communications is therefore often doomed by the "curse of dimensionality", meaning that the training complexity is exponential in the number of information bits. As a result, most current learning approaches (besides weighted BP decoding) are limited with respect to scalability and tend to have a tremendous amount of trainable parameters (in the range of millions of weights even for short codes). These schemes require expensive re-training—or to store and load precalculated parameters—for every set of new code parameters.

Advantageously and by contrast to the above channel decoding schemes, the inventive approaches presented herein exhibit scalability to arbitrary block lengths, and training is not limited by the usual "curse" of dimensionality. Indeed, the presently described inventive techniques outperform with respect to error-rates, signal-to-noise ratio (dB) and number of decoding iterations. Further still, according to experimental analysis and for BCH codes, an exemplary GNN decoder is fully parameterized with less than 10,000 weights.

A further advantage is that the presently disclosed inventive concepts are channel model agnostic, and can be used for any channel model, including but not limited to wireless, optical, acoustic, light, quantum, storage systems, etc., according to various implementations.

Exemplary Embodiments

FIG. 1 illustrates a method 100 for channel decoding using a graph neural network (GNN)-based decoder, in accordance with one embodiment. Precisely speaking, the method 100 as shown in FIG. 1 is most applicable to embodiments in which a codeword of a binary code (i.e., a sequence of bits or log-likelihood ratios (LLRs)) as opposed to the code itself, which relates more to the generator/parity-check matrix (i.e., the definition of the code).

The method 100 may be carried out using at least one processor (e.g., a graphics processing unit (GPU), central processing unit (CPU), GPU and/or CPU accelerator, etc.), which may be located on a computer system such as that described below with reference to FIGS. 2-5. The method 100 may be carried out by a combination of hardware and/or software of a communication system, where such communication system may provide wireless or optical communication functionality (messaging).

In operation 102, one or more codewords of a linear block code is/are received. The linear block code refers to a code in linear block form that is generated in accordance with a code scheme. The code scheme may be low-density parity-check (LDPC), Polar, or Bose-Chaudhuri-Hocquenghem (BCH) schemes, for example. In various embodiments, the linear block code may be in a binary format, or a non-binary format. The linear block code may be generated by the communication system mentioned above.

In an embodiment, the linear block code may represent message bits (k bits) and parity (i.e. check) bits (n-k bits) for a message generated by the communication system. The parity bits and message bits may have a linear combination, such that a resultant codeword (i.e. the linear block code) is the linear combination of any two codewords in the binary field.

In operation 104, the received codeword(s) are embedded into a higher dimensional space. As will be appreciated by those having ordinary skill in the art upon reviewing the presently disclosed inventive concepts, in preferred approaches embedding received codeword(s) into a higher dimensional space may involve projecting received bit(s), codeword(s), etc. (and/or associated log likelihood ratios (LLRs), symbol probabilities, probability mass functions (PMFs), etc., which may be scalar values or non-scalar values, usually depending on whether the linear block code is a binary code or a non-binary code) to a multi-dimensional vector of predetermined size, e.g., of size $F_N=32$. In certain embodiments, particularly involving binary codes, this projection may include independently projecting each (scalar) LLR, symbol probability, etc. to a vector of size $F_N>1$. In more embodiments, particularly involving non-binary codes, this projection may include independently projecting one or more of a plurality of PMFs onto a multi-dimensional vector of higher dimensionality than the PMF as received at the device. In other words, projection in the case of non-binary codes may involve project a q-dimensional PMF to a dimensional space of size $F_N$, where $F_N > q$.

Turning now to operation 106 of method 100, the embedded codeword(s) is/are decoded, using a GNN-based decoder trained to decode linear block codes of arbitrary block length. Accordingly, the GNN-based decoder may be used to decode linear block codes generated according to various different code schemes, such as those mentioned above.

Accordingly, in an embodiment, a (possibly noisy) codeword of a linear block code is received, and the binary linear block code is decoded using a graph neural network (GNN)-based decoder trained to decode linear block codes of arbitrary block length.

In some embodiments, the linear block code is a binary code. According to such embodiments, the input to the GNN-based decoder includes: a plurality of log likelihood ratios (LLRs) corresponding to channel observations regarding the received codeword of a linear block code; and a plurality of trainable parameters. The plurality of trainable parameters may include any combination or permutation of: factor node update parameters $\theta_u$; variable node update parameters $\theta_v$; variable to factor message update attribute parameters $\theta_{m_{v \to u}}$; factor to variable message update attribute parameters $\theta_{m_{u \to v}}$; factor node attribute parameters $\{g_{v_i}\} \forall v_i \in V$; variable node attribute parameters $\{g_{vu_i}\} \forall u_j \in U$; message attribute parameters $$\{g_{m_{v_i \to u_j}}, g_{m_{u_j \to v_i}}\},$$

$\forall_{(v_j, u_j)} \in \varepsilon$; an input embedding parameter w; and/or an output embedding q.

Furthermore, each variable node v may represent a transmitted codeword bit of the linear block code, while each factor node u may denote a node constraint; V may denote the set of all variable nodes in a bi-partite graph of a parity check matrix of the linear block code; U may denote the set of all factor nodes in the graph; and $\varepsilon$ may denote the set of all edges $e_{i,j} = (v_i; u_j)$ in the graph.

In an embodiment, decoding the received linear block code comprises: receiving or generating input that includes: a plurality of log likelihood ratios (LLRs) corresponding to channel observations regarding one or more bit values of the linear block code; and a plurality of trainable parameters; initializing graph nodes of the GNN-based decoder, wherein initializing the graph nodes comprises assigning a plurality of initial variable node values to a plurality of variable nodes based at least in part on the plurality of LLRs; iteratively decoding the received linear block code; computing one or more final variable node values based on the iterative decoding process; projecting the computed final variable node value(s) to final, scalar LLRs; and determining the one or more bit values of the linear block code based on the final, scalar LLRs.

Moreover, in an embodiment each decoding iteration may involve: updating one or more variable to factor node messages based at least in part on one or more of the plurality of trainable parameters; updating one or more factor nodes based at least in part on one or more of the plurality of trainable parameters; updating one or more factor to variable node messages based at least in part on one or more of the plurality of trainable parameters; and/or updating one or more variable nodes based at least in part on one or more of the plurality of trainable parameters. Preferably, where the linear block code is in binary format, the GNN-based decoder is trained using iterative loop-unrolling for all iterations.

In more embodiments, the linear block code is a non-binary code. According to such embodiments, the input to the GNN-based decoder includes: a plurality of probability vectors corresponding to transmitted codeword(s) of the linear block code; and a plurality of trainable parameters. Each probability vector is preferably defined as $p_{ch}(c_k|y_k) \in [0,1]^q$ for each transmitted codeword symbol $c_k$; where q denotes the alphabet size of the transmitted symbol $c_k$; and $y_k$ denotes the channel observation for the transmitted symbol $c_k$. In further embodiments, $y_k$ may be defined by $p(c_k|y)$, where y denotes a vector representing all of the transmitted codeword symbols that were received at the device. Defining $y_k$ by $p(c_k|y)$, advantageously allows consideration of channels with memory, e.g, channels for which $c_k$ depends not only on $y_k$, but also on $y_{\{k-1\}}, y_{\{k-2\}}, \ldots$ etc. as would be understood by a person having ordinary skill in the art upon reading the present disclosure.

The plurality of trainable parameters may include any combination or permutation of: factor node update parameters $\theta_u$; variable node update parameters $\theta_v$; variable to factor message update attribute parameters $\theta_{m_{v \to u}}$; factor to variable message update attribute parameters $\theta_{m_{u \to v}}$; factor node attribute parameters $\{g_{v_i}\} \forall v_i \in V$; variable node attribute parameters $\{g_{vu_i}\} \forall u_j \in U$; message attribute parameters $$\{g_{m_{v_i \to u_j}}, g_{m_{u_j \to v_i}}\},$$

$\forall_{(v_i, u_j)} \in \varepsilon$; an input transformation $W \in R^{F_n \times q}$; and/or an output transformation $Q \in R^{q \times F_n}$. Furthermore, each variable node v may represent a transmitted codeword bit of the linear block code, while each factor node u may denote a node constraint; V may denote the set of all variable nodes in a bi-partite graph of a parity check matrix of the linear block code; U may denote the set of all factor nodes in the graph; and $\varepsilon$ may denote the set of all edges $e_{i,j} = (v_i; u_j)$ in the graph. Further still, in the context of linear block code in non-binary format, each variable preferably represents a non-binary symbol (which may optionally be mapped to a sequence of bits), in some approaches.

In an embodiment, decoding the received linear block code comprises: receiving or generating input that includes: a plurality of probability vectors corresponding to transmitted codeword(s) of the linear block code; and a plurality of trainable parameters; initializing graph nodes of the GNN-based decoder, wherein initializing the graph nodes comprises assigning a plurality of initial variable node values to a plurality of variable nodes based at least in part on the plurality of probability vectors; iteratively decoding the received linear block code; computing one or more final variable node values based on the iterative decoding process; projecting the computed final variable node value(s) to final probability vectors; and determining the one or more bit values of the linear block code based on the final probability vectors.

Moreover, in an embodiment each decoding iteration may involve: updating one or more variable to factor node messages based at least in part on one or more of the plurality of trainable parameters; updating one or more factor nodes based at least in part on one or more of the plurality of trainable parameters; updating one or more factor to variable node messages based at least in part on one or more of the plurality of trainable parameters; and/or updating one or more variable nodes based at least in part on one or more of the plurality of trainable parameters. Preferably, where the linear block code is in non-binary format, the GNN-based decoder is trained using categorical cross-entropy loss for all iterations.

In an embodiment, the GNN-based decoder an estimated value of a transmitted codeword bit of the linear block code. The decoder may decode the linear block code based on a bi-partite graph of a parity check matrix of the linear block code. The bi-partite graph may include a plurality of variable nodes representing graph may include a plurality of factor nodes each representing a code constraint. The plurality of variable nodes may be connected in the bi-partite graph to the plurality of factor nodes.

Further, the bi-partite graph may include a plurality of node values computed as defined dimensional vectors for respective variable nodes of the plurality of variable nodes and factor nodes of the plurality of factor nodes. The bi-partite graph may include directed edge values, each being a directed edge message that has an assigned defined dimensional value. Each variable node of the plurality of variable nodes and each factor node of the plurality of factor nodes may have an assigned node-specific attribute. Each edge in the bi-partite graph may have an assigned edge-specific attribute that depends on edge direction.

In an embodiment, the GNN-based decoder may include trainable edge message update functions and trainable node update functions. The GNN-based decoder may initialize nodes of the bi-partite graph. The GNN-based decoder may apply a linear input embedding that uses a trainable parameter. The GNN-based decoder may output soft estimates on transmitted codeword bits of the linear block code, wherein the soft estimates are computed using a trainable parameter. The GNN-based decoder may perform iterative node and message updates until reaching a maximum number of iterations.

In an embodiment, particularly where the linear block code is in binary format, the GNN-based decoder may be trained using iterative loop-unrolling for all iterations. In an embodiment, inference of the trained decoder may be allowed with a variable number of iterations which enables early stopping of the decoder.

In an embodiment, particularly where the linear block code is in a non-binary format, the GNN-based decoder may be trained using categorical cross-entropy loss. In an embodiment, inference of the trained decoder may be allowed with a variable number of iterations which enables early stopping of the decoder.

Corresponding systems and computer program products for performing GNN-based channel decoding are also disclosed.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Parallel Processing Architecture

Figure 2:
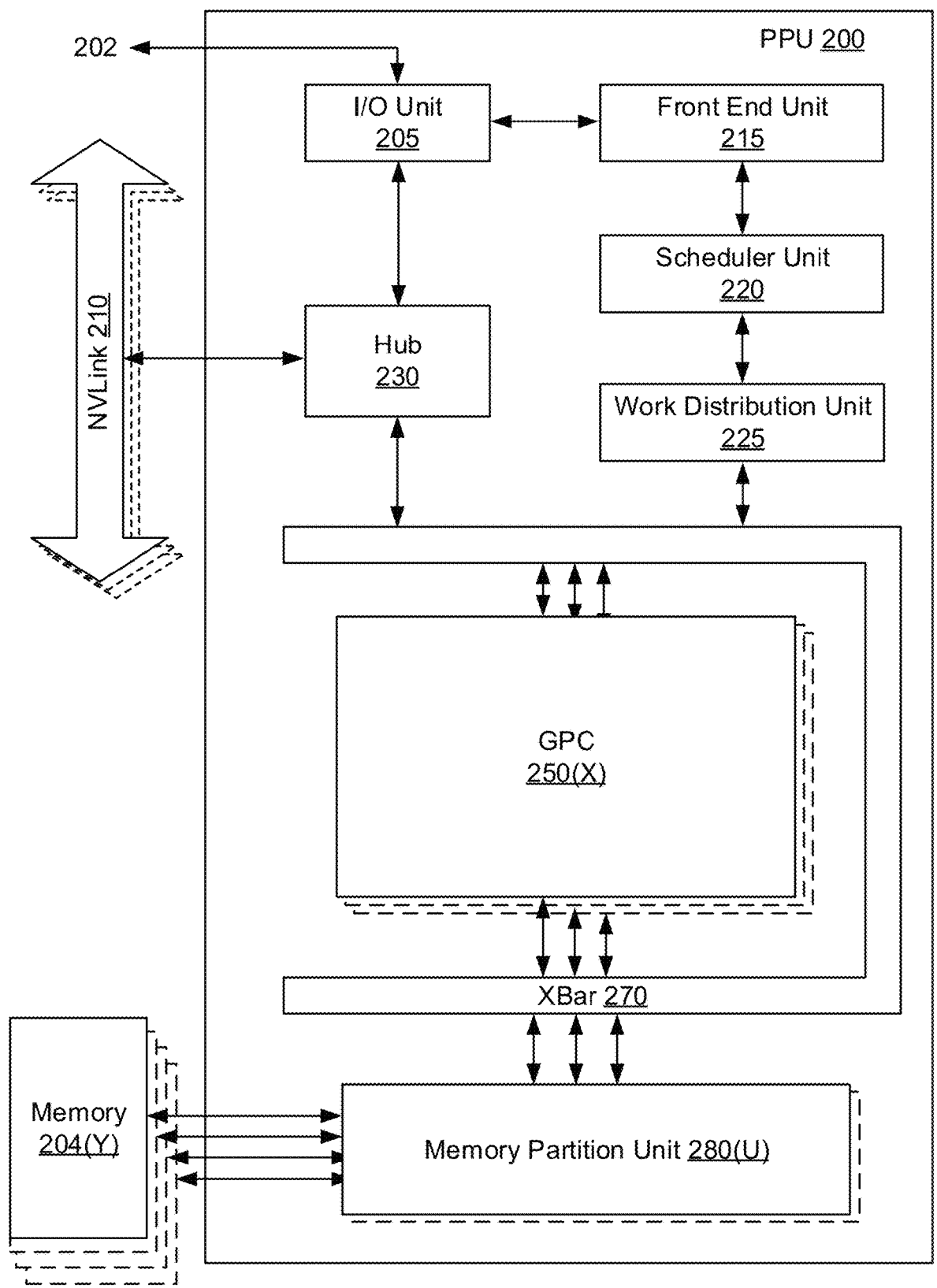
FIG. 2 illustrates a parallel processing unit, in accordance with an embodiment of the inventive concepts disclosed herein.

FIG. 2 illustrates a parallel processing unit (PPU) 200, in accordance with an embodiment. In an embodiment, the PPU 200 is a multi-threaded processor that is implemented on one or more integrated circuit devices. The PPU 200 is a latency hiding architecture designed to process many threads in parallel. A thread (i.e., a thread of execution) is an instantiation of a set of instructions configured to be executed by the PPU 200. In an embodiment, the PPU 200 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 200 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 200 may be configured to accelerate thousands of High Performance Computing (HPC), data center, and machine learning applications. The PPU 200 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 2, the PPU 200 includes an Input/Output (I/O) unit 205, a front end unit 215, a scheduler unit 220, a work distribution unit 225, a hub 230, a crossbar (Xbar) 270, one or more general processing clusters (GPCs) 250, and one or more partition units 280. The PPU 200 may be connected to a host processor or other PPUs 200 via one or more high-speed NVLink 210 interconnect. The PPU 200 may be connected to a host processor or other peripheral devices via an interconnect 202. The PPU 200 may also be connected to a local memory comprising a number of memory devices 204. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 210 interconnect enables systems to scale and include one or more PPUs 200 combined with one or more CPUs, supports cache coherence between the PPUs 200 and CPUs, and CPU mastering. Data and/or commands may be transmitted by the NVLink 210 through the hub 230 to/from other units of the PPU 200 such as one or more copy engines, a video encoder, a video decoder, a power management unit, etc. (not explicitly shown). The NVLink 210 is described in more detail in conjunction with FIG. 4B.

The I/O unit 205 is configured to transmit and receive communications (i.e., commands, data, etc.) from a host processor (not shown) over the interconnect 202. The I/O unit 205 may communicate with the host processor directly via the interconnect 202 or through one or more intermediate devices such as a memory bridge. In an embodiment, the I/O unit 205 may communicate with one or more other processors, such as one or more the PPUs 200 via the interconnect 202. In an embodiment, the I/O unit 205 implements a Peripheral Component Interconnect Express (PCIe) interface for communications over a PCIe bus and the interconnect 202 is a PCIe bus. In alternative embodiments, the I/O unit 205 may implement other types of well-known interfaces for communicating with external devices.

The I/O unit 205 decodes packets received via the interconnect 202. In an embodiment, the packets represent commands configured to cause the PPU 200 to perform various operations. The I/O unit 205 transmits the decoded commands to various other units of the PPU 200 as the commands may specify. For example, some commands may be transmitted to the front end unit 215. Other commands may be transmitted to the hub 230 or other units of the PPU 200 such as one or more copy engines, a video encoder, a video decoder, a power management unit, etc. (not explicitly shown). In other words, the I/O unit 205 is configured to route communications between and among the various logical units of the PPU 200.

In an embodiment, a program executed by the host processor encodes a command stream in a buffer that provides workloads to the PPU 200 for processing. A workload may comprise several instructions and data to be processed by those instructions. The buffer is a region in a memory that is accessible (i.e., read/write) by both the host processor and the PPU 200. For example, the I/O unit 205 may be configured to access the buffer in a system memory connected to the interconnect 202 via memory requests transmitted over the interconnect 202. In an embodiment, the host processor writes the command stream to the buffer and then transmits a pointer to the start of the command stream to the PPU 200. The front end unit 215 receives pointers to one or more command streams. The front end unit 215 manages the one or more streams, reading commands from the streams and forwarding commands to the various units of the PPU 200.

The front end unit 215 is coupled to a scheduler unit 220 that configures the various GPCs 250 to process tasks defined by the one or more streams. The scheduler unit 220 is configured to track state information related to the various tasks managed by the scheduler unit 220. The state may indicate which GPC 250 a task is assigned to, whether the task is active or inactive, a priority level associated with the task, and so forth. The scheduler unit 220 manages the execution of a plurality of tasks on the one or more GPCs 250.

The scheduler unit 220 is coupled to a work distribution unit 225 that is configured to dispatch tasks for execution on the GPCs 250. The work distribution unit 225 may track a number of scheduled tasks received from the scheduler unit 220. In an embodiment, the work distribution unit 225 manages a pending task pool and an active task pool for each of the GPCs 250. The pending task pool may comprise a number of slots (e.g., 32 slots) that contain tasks assigned to be processed by a particular GPC 250. The active task pool may comprise a number of slots (e.g., 4 slots) for tasks that are actively being processed by the GPCs 250. As a GPC 250 finishes the execution of a task, that task is evicted from the active task pool for the GPC 250 and one of the other tasks from the pending task pool is selected and scheduled for execution on the GPC 250. If an active task has been idle on the GPC 250, such as while waiting for a data dependency to be resolved, then the active task may be evicted from the GPC 250 and returned to the pending task pool while another task in the pending task pool is selected and scheduled for execution on the GPC 250.

The work distribution unit 225 communicates with the one or more GPCs 250 via XBar 270. The XBar 270 is an interconnect network that couples many of the units of the PPU 200 to other units of the PPU 200. For example, the XBar 270 may be configured to couple the work distribution unit 225 to a particular GPC 250. Although not shown explicitly, one or more other units of the PPU 200 may also be connected to the XBar 270 via the hub 230.

The tasks are managed by the scheduler unit 220 and dispatched to a GPC 250 by the work distribution unit 225. The GPC 250 is configured to process the task and generate results. The results may be consumed by other tasks within the GPC 250, routed to a different GPC 250 via the XBar 270, or stored in the memory 204. The results can be written to the memory 204 via the partition units 280, which implement a memory interface for reading and writing data to/from the memory 204. The results can be transmitted to another PPU 200 or CPU via the NVLink 210. In an embodiment, the PPU 200 includes a number U of partition units 280 that is equal to the number of separate and distinct memory devices 204 coupled to the PPU 200. A partition unit 280 will be described in more detail below in conjunction with FIG. 3B.

In an embodiment, a host processor executes a driver kernel that implements an application programming interface (API) that enables one or more applications executing on the host processor to schedule operations for execution on the PPU 200. In an embodiment, multiple compute applications are simultaneously executed by the PPU 200 and the PPU 200 provides isolation, quality of service (QoS), and independent address spaces for the multiple compute applications. An application may generate instructions (i.e., API calls) that cause the driver kernel to generate one or more tasks for execution by the PPU 200. The driver kernel outputs tasks to one or more streams being processed by the PPU 200. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 4A.

Figure 3A:
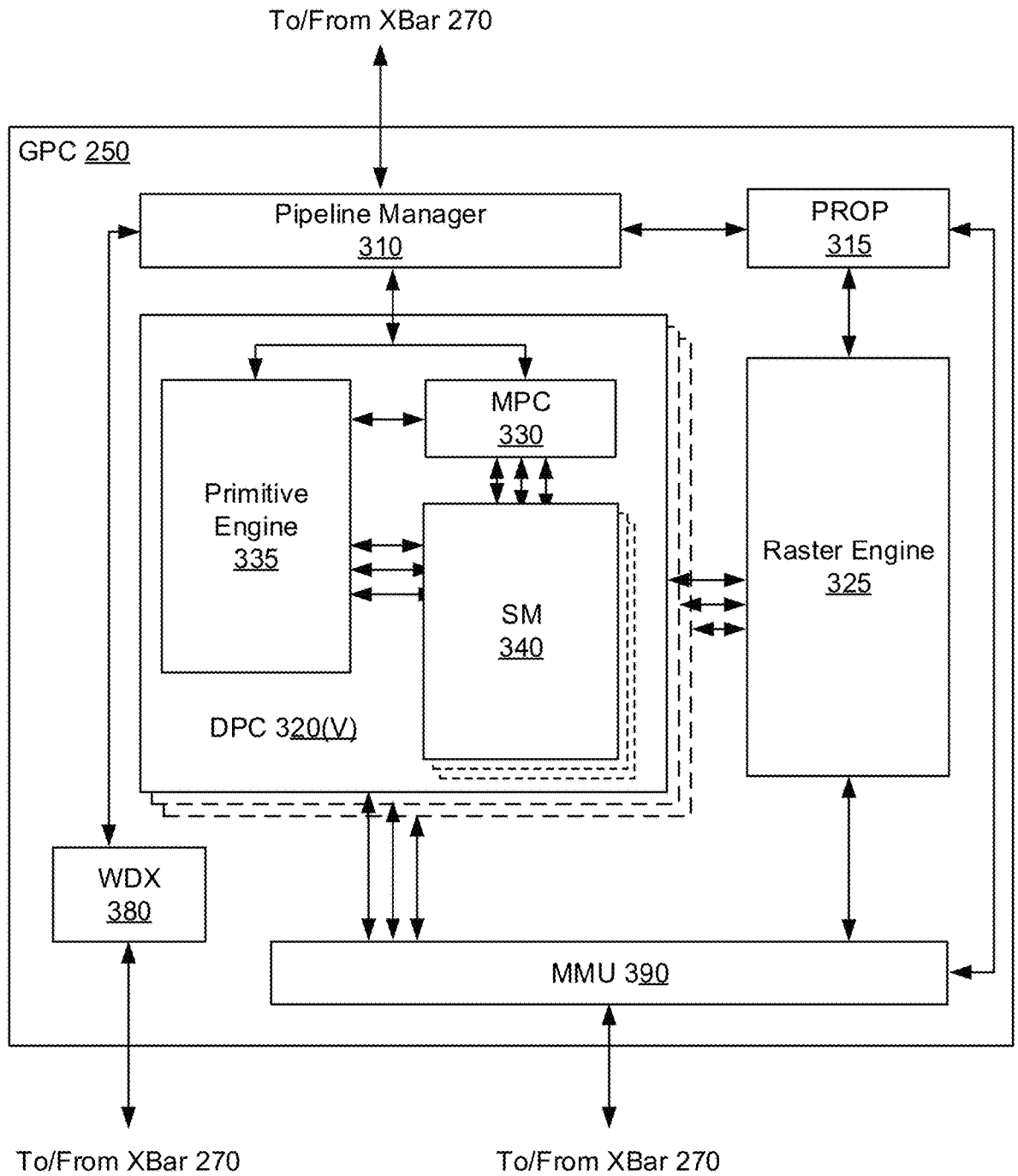
FIG. 3A illustrates a general processing cluster within the parallel processing unit of FIG. 2, in accordance with an embodiment of the presently described inventive concepts.

FIG. 3A illustrates a GPC 250 of the PPU 200 of FIG. 2, in accordance with an embodiment. As shown in FIG. 3A, each GPC 250 includes a number of hardware units for processing tasks. In an embodiment, each GPC 250 includes a pipeline manager 310, a pre-raster operations unit (PROP) 315, a raster engine 325, a work distribution crossbar (WDX) 380, a memory management unit (MMU) 390, and one or more Data Processing Clusters (DPCs) 320. It will be appreciated that the GPC 250 of FIG. 3A may include other hardware units in lieu of or in addition to the units shown in FIG. 3A.

In an embodiment, the operation of the GPC 250 is controlled by the pipeline manager 310. The pipeline manager 310 manages the configuration of the one or more DPCs 320 for processing tasks allocated to the GPC 250. In an embodiment, the pipeline manager 310 may configure at least one of the one or more DPCs 320 to implement at least a portion of a graphics rendering pipeline. For example, a DPC 320 may be configured to execute a vertex shader program on the programmable streaming multiprocessor (SM) 340. The pipeline manager 310 may also be configured to route packets received from the work distribution unit 225 to the appropriate logical units within the GPC 250. For example, some packets may be routed to fixed function hardware units in the PROP 315 and/or raster engine 325 while other packets may be routed to the DPCs 320 for processing by the primitive engine 335 or the SM 340. In an embodiment, the pipeline manager 310 may configure at least one of the one or more DPCs 320 to implement a neural network model and/or a computing pipeline.

Figure 3B:
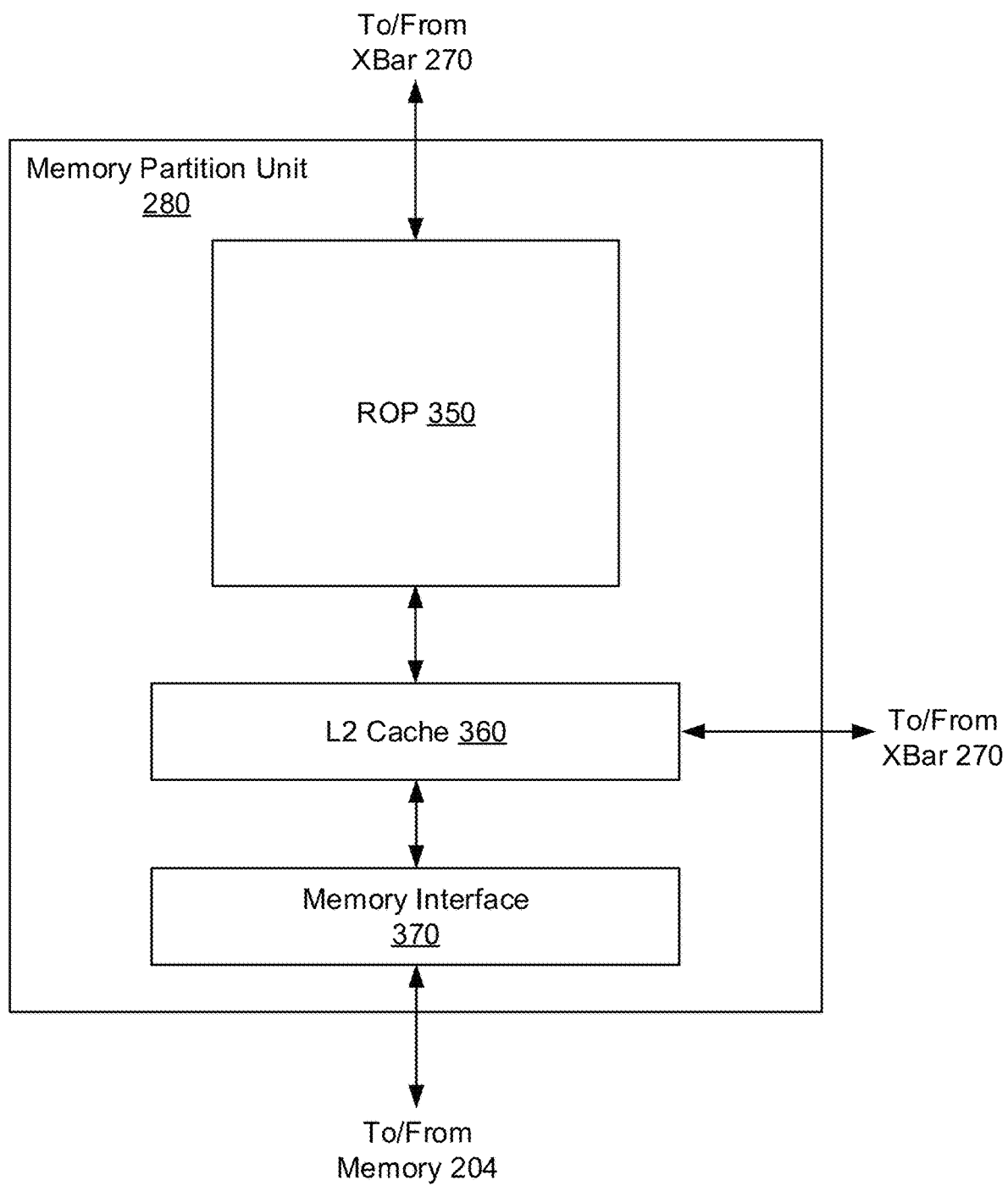
FIG. 3B illustrates a memory partition unit of the parallel processing unit of FIG. 2, in accordance with an embodiment.

The PROP unit 315 is configured to route data generated by the raster engine 325 and the DPCs 320 to a Raster Operations (ROP) unit, described in more detail in conjunction with FIG. 3B. The PROP unit 315 may also be configured to perform optimizations for color blending, organize pixel data, perform address translations, and the like.

The raster engine 325 includes a number of fixed function hardware units configured to perform various raster operations. In an embodiment, the raster engine 325 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 325 comprises fragments to be processed, for example, by a fragment shader implemented within a DPC 320.

Each DPC 320 included in the GPC 250 includes an M-Pipe Controller (MPC) 330, a primitive engine 335, and one or more SMs 340. The MPC 330 controls the operation of the DPC 320, routing packets received from the pipeline manager 310 to the appropriate units in the DPC 320. For example, packets associated with a vertex may be routed to the primitive engine 335, which is configured to fetch vertex attributes associated with the vertex from the memory 204. In contrast, packets associated with a shader program may be transmitted to the SM 340.

The SM 340 comprises a programmable streaming processor that is configured to process tasks represented by a number of threads. Each SM 340 is multi-threaded and configured to execute a plurality of threads (e.g., 32 threads) from a particular group of threads concurrently. In an embodiment, the SM 340 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 340 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 340 will be described in more detail below in conjunction with FIG. 4A.

The MMU 390 provides an interface between the GPC 250 and the partition unit 280. The MMU 390 may provide translation of virtual addresses into physical addresses, memory protection, and arbitration of memory requests. In an embodiment, the MMU 390 provides one or more translation lookaside buffers (TLB s) for performing translation of virtual addresses into physical addresses in the memory 204.

FIG. 3B illustrates a memory partition unit 280 of the PPU 200 of FIG. 2, in accordance with an embodiment. As shown in FIG. 3B, the memory partition unit 280 includes a Raster Operations (ROP) unit 350, a level two (L2) cache 360, and a memory interface 370. The memory interface 370 is coupled to the memory 204. Memory interface 370 may implement 32, 64, 128, 1024-bit data buses, or the like, for high-speed data transfer. In an embodiment, the PPU 200 incorporates U memory interfaces 370, one memory interface 370 per pair of partition units 280, where each pair of partition units 280 is connected to a corresponding memory device 204. For example, PPU 200 may be connected to up to Y memory devices 204, such as high bandwidth memory stacks or graphics double-data-rate, version 5, synchronous dynamic random access memory, or other types of persistent storage.

In an embodiment, the memory interface 370 implements an HBM2 memory interface and Y equals half U. In an embodiment, the HBM2 memory stacks are located on the same physical package as the PPU 200, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 204 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 200 process very large datasets and/or run applications for extended periods.

In an embodiment, the PPU 200 implements a multi-level memory hierarchy. In an embodiment, the memory partition unit 280 supports a unified memory to provide a single unified virtual address space for CPU and PPU 200 memory, enabling data sharing between virtual memory systems. In an embodiment the frequency of accesses by a PPU 200 to memory located on other processors is traced to ensure that memory pages are moved to the physical memory of the PPU 200 that is accessing the pages more frequently. In an embodiment, the NVLink 210 supports address translation services allowing the PPU 200 to directly access a CPU's page tables and providing full access to CPU memory by the PPU 200.

In an embodiment, copy engines transfer data between multiple PPUs 200 or between PPUs 200 and CPUs. The copy engines can generate page faults for addresses that are not mapped into the page tables. The memory partition unit 280 can then service the page faults, mapping the addresses into the page table, after which the copy engine can perform the transfer. In a conventional system, memory is pinned (i.e., non-pageable) for multiple copy engine operations between multiple processors, substantially reducing the available memory. With hardware page faulting, addresses can be passed to the copy engines without worrying if the memory pages are resident, and the copy process is transparent.

Data from the memory 204 or other system memory may be fetched by the memory partition unit 280 and stored in the L2 cache 360, which is located on-chip and is shared between the various GPCs 250. As shown, each memory partition unit 280 includes a portion of the L2 cache 360 associated with a corresponding memory device 204. Lower level caches may then be implemented in various units within the GPCs 250. For example, each of the SMs 340 may implement a level one (L1) cache. The L1 cache is private memory that is dedicated to a particular SM 340. Data from the L2 cache 360 may be fetched and stored in each of the L1 caches for processing in the functional units of the SMs 340. The L2 cache 360 is coupled to the memory interface 370 and the XBar 270.

The ROP unit 350 performs graphics raster operations related to pixel color, such as color compression, pixel blending, and the like. The ROP unit 350 also implements depth testing in conjunction with the raster engine 325, receiving a depth for a sample location associated with a pixel fragment from the culling engine of the raster engine 325. The depth is tested against a corresponding depth in a depth buffer for a sample location associated with the fragment. If the fragment passes the depth test for the sample location, then the ROP unit 350 updates the depth buffer and transmits a result of the depth test to the raster engine 325. It will be appreciated that the number of partition units 280 may be different than the number of GPCs 250 and, therefore, each ROP unit 350 may be coupled to each of the GPCs 250. The ROP unit 350 tracks packets received from the different GPCs 250 and determines which GPC 250 that a result generated by the ROP unit 350 is routed to through the Xbar 270. Although the ROP unit 350 is included within the memory partition unit 280 in FIG. 3B, in other embodiment, the ROP unit 350 may be outside of the memory partition unit 280. For example, the ROP unit 350 may reside in the GPC 250 or another unit.

Figure 4A:
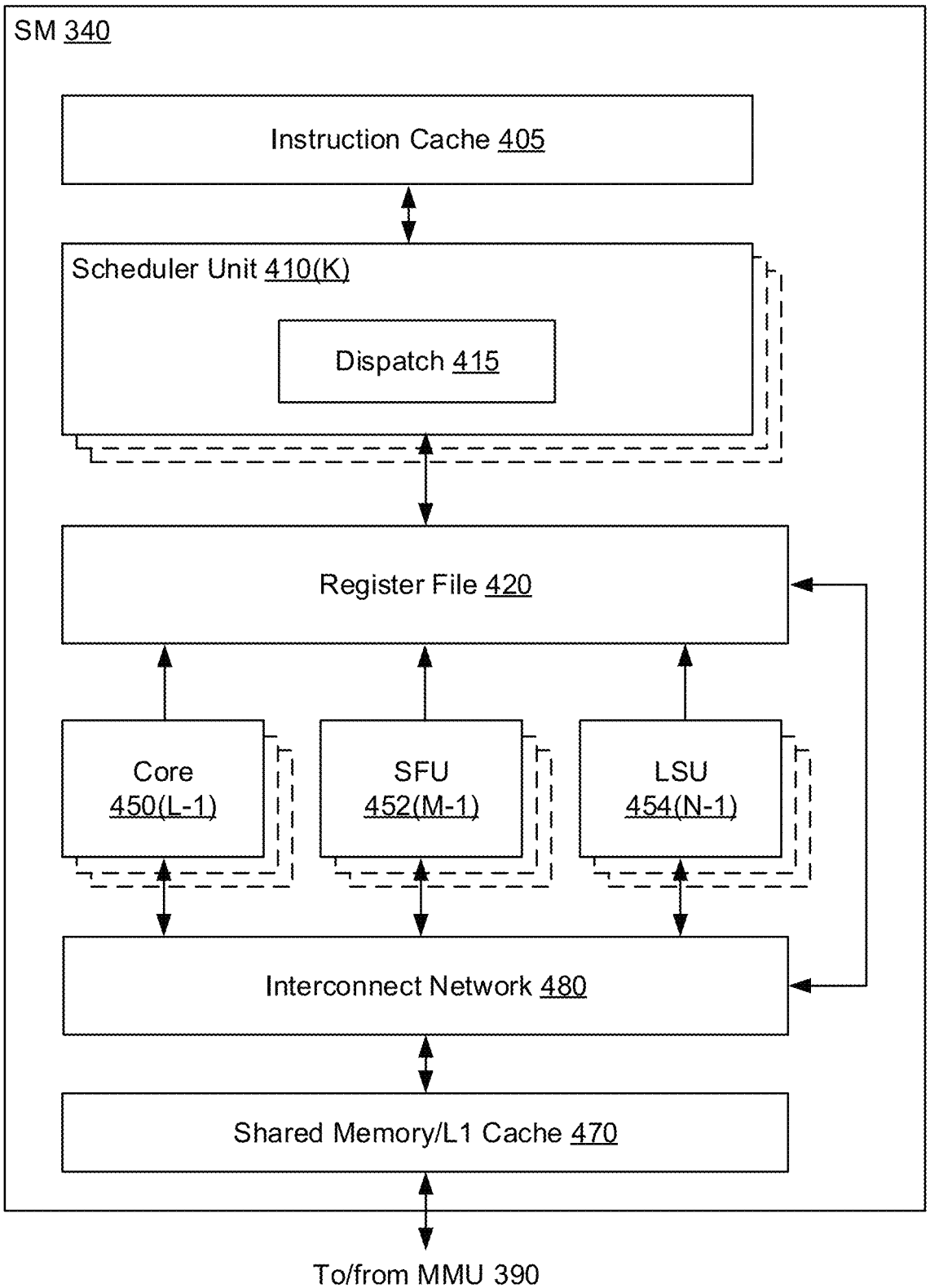
FIG. 4A illustrates the streaming multi-processor of FIG. 3A, in accordance with an embodiment of the presently described inventive concepts.

FIG. 4A illustrates the streaming multi-processor 340 of FIG. 3A, in accordance with an embodiment. As shown in FIG. 4A, the SM 340 includes an instruction cache 405, one or more scheduler units 410(K), a register file 420, one or more processing cores 450, one or more special function units (SFUs) 452, one or more load/store units (LSUs) 454, an interconnect network 480, a shared memory/L1 cache 470.

As described above, the work distribution unit 225 dispatches tasks for execution on the GPCs 250 of the PPU 200. The tasks are allocated to a particular DPC 320 within a GPC 250 and, if the task is associated with a shader program, the task may be allocated to an SM 340. The scheduler unit 410(K) receives the tasks from the work distribution unit 225 and manages instruction scheduling for one or more thread blocks assigned to the SM 340. The scheduler unit 410(K) schedules thread blocks for execution as warps of parallel threads, where each thread block is allocated at least one warp. In an embodiment, each warp executes 32 threads. The scheduler unit 410(K) may manage a plurality of different thread blocks, allocating the warps to the different thread blocks and then dispatching instructions from the plurality of different cooperative groups to the various functional units (i.e., cores 450, SFUs 452, and LSUs 454) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (i.e., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (i.e., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 415 is configured to transmit instructions to one or more of the functional units. In the embodiment, the scheduler unit 410(K) includes two dispatch units 415 that enable two different instructions from the same warp to be dispatched during each clock cycle. In alternative embodiments, each scheduler unit 410(K) may include a single dispatch unit 415 or additional dispatch units 415.

Each SM 340 includes a register file 420 that provides a set of registers for the functional units of the SM 340. In an embodiment, the register file 420 is divided between each of the functional units such that each functional unit is allocated a dedicated portion of the register file 420. In another embodiment, the register file 420 is divided between the different warps being executed by the SM 340. The register file 420 provides temporary storage for operands connected to the data paths of the functional units.

Each SM 340 comprises L processing cores 450. In an embodiment, the SM 340 includes a large number (e.g., 128, etc.) of distinct processing cores 450. Each core 450 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 450 include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the cores 450. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as the CUDA 10 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 340 also comprises M SFUs 452 that perform special functions (e.g., attribute evaluation, reciprocal square root, and the like). In an embodiment, the SFUs 452 may include a tree traversal unit configured to traverse a hierarchical tree data structure. In an embodiment, the SFUs 452 may include texture unit configured to perform texture map filtering operations. In an embodiment, the texture units are configured to load texture maps (e.g., a 2D array of texels) from the memory 204 and sample the texture maps to produce sampled texture values for use in shader programs executed by the SM 340. In an embodiment, the texture maps are stored in the shared memory/L1 cache 370. The texture units implement texture operations such as filtering operations using mip-maps (i.e., texture maps of varying levels of detail). In an embodiment, each SM 240 includes two texture units.

Each SM 340 also comprises N LSUs 454 that implement load and store operations between the shared memory/L1 cache 470 and the register file 420. Each SM 340 includes an interconnect network 480 that connects each of the functional units to the register file 420 and the LSU 454 to the register file 420, shared memory/L1 cache 470. In an embodiment, the interconnect network 480 is a crossbar that can be configured to connect any of the functional units to any of the registers in the register file 420 and connect the LSUs 454 to the register file and memory locations in shared memory/L1 cache 470.

The shared memory/L1 cache 470 is an array of on-chip memory that allows for data storage and communication between the SM 340 and the primitive engine 335 and between threads in the SM 340. In an embodiment, the shared memory/L1 cache 470 comprises 128 KB of storage capacity and is in the path from the SM 340 to the partition unit 280. The shared memory/L1 cache 470 can be used to cache reads and writes. One or more of the shared memory/L1 cache 470, L2 cache 360, and memory 204 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 470 enables the shared memory/L1 cache 470 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 2, are bypassed, creating a much simpler programming model. In the general purpose parallel computation configuration, the work distribution unit 225 assigns and distributes blocks of threads directly to the DPCs 320. The threads in a block execute the same program, using a unique thread ID in the calculation to ensure each thread generates unique results, using the SM 340 to execute the program and perform calculations, shared memory/L1 cache 470 to communicate between threads, and the LSU 454 to read and write global memory through the shared memory/L1 cache 470 and the memory partition unit 280. When configured for general purpose parallel computation, the SM 340 can also write commands that the scheduler unit 220 can use to launch new work on the DPCs 320.

The PPU 200 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 200 is embodied on a single semiconductor substrate. In another embodiment, the PPU 200 is included in a system-on-a-chip (SoC) along with one or more other devices such as additional PPUs 200, the memory 204, a reduced instruction set computer (RISC) CPU, a memory management unit (MMU), a digital-to-analog converter (DAC), and the like.

In an embodiment, the PPU 200 may be included on a graphics card that includes one or more memory devices 204. The graphics card may be configured to interface with a PCIe slot on a motherboard of a desktop computer. In yet another embodiment, the PPU 200 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 4B:
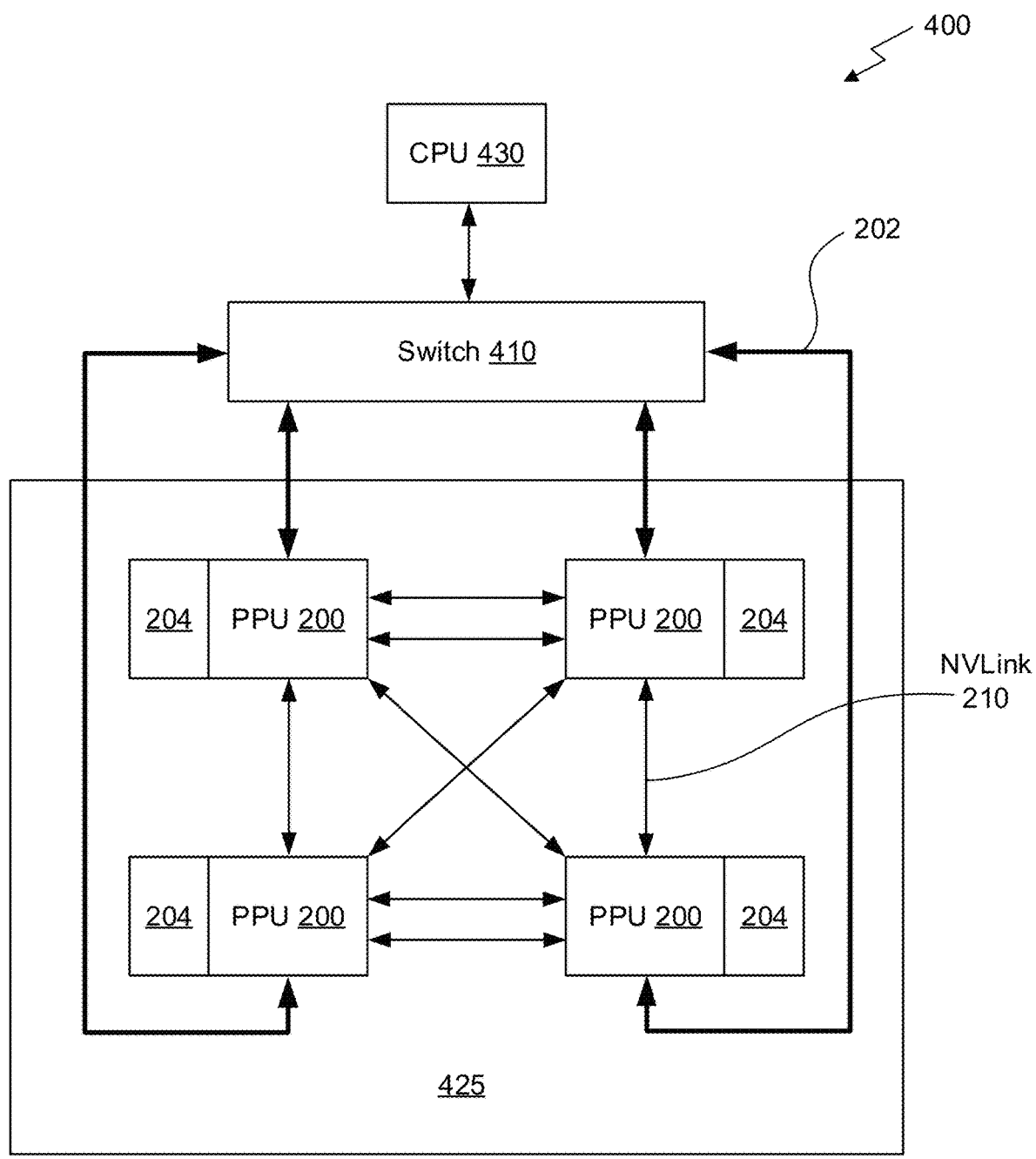
FIG. 4B is a conceptual diagram of a processing system implemented using the PPU of FIG. 2, in accordance with an embodiment of the presently described inventive concepts.

FIG. 4B is a conceptual diagram of a processing system 400 implemented using the PPU 200 of FIG. 2, in accordance with an embodiment. The exemplary system 465 may be configured to implement the method 100 shown in FIG. 1. The processing system 400 includes a CPU 430, switch 410, and multiple PPUs 200 each and respective memories 204. The NVLink 210 provides high-speed communication links between each of the PPUs 200. Although a particular number of NVLink 210 and interconnect 202 connections are illustrated in FIG. 4B, the number of connections to each PPU 200 and the CPU 430 may vary. The switch 410 interfaces between the interconnect 202 and the CPU 430. The PPUs 200, memories 204, and NVLinks 210 may be situated on a single semiconductor platform to form a parallel processing module 425. In an embodiment, the switch 410 supports two or more protocols to interface between various different connections and/or links.

In another embodiment (not shown), the NVLink 210 provides one or more high-speed communication links between each of the PPUs 200 and the CPU 430 and the switch 410 interfaces between the interconnect 202 and each of the PPUs 200. The PPUs 200, memories 204, and interconnect 202 may be situated on a single semiconductor platform to form a parallel processing module 425. In yet another embodiment (not shown), the interconnect 202 provides one or more communication links between each of the PPUs 200 and the CPU 430 and the switch 410 interfaces between each of the PPUs 200 using the NVLink 210 to provide one or more high-speed communication links between the PPUs 200. In another embodiment (not shown), the NVLink 210 provides one or more high-speed communication links between the PPUs 200 and the CPU 430 through the switch 410. In yet another embodiment (not shown), the interconnect 202 provides one or more communication links between each of the PPUs 200 directly. One or more of the NVLink 210 high-speed communication links may be implemented as a physical NVLink interconnect or either an on-chip or on-die interconnect using the same protocol as the NVLink 210.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 425 may be implemented as a circuit board substrate and each of the PPUs 200 and/or memories 204 may be packaged devices. In an embodiment, the CPU 430, switch 410, and the parallel processing module 425 are situated on a single semiconductor platform.

In an embodiment, the signaling rate of each NVLink 210 is 20 to 25 Gigabits/second and each PPU 200 includes six NVLink 210 interfaces (as shown in FIG. 4B, five NVLink 210 interfaces are included for each PPU 200). Each NVLink 210 provides a data transfer rate of 25 Gigabytes/second in each direction, with six links providing 300 Gigabytes/second. The NVLinks 210 can be used exclusively for PPU-to-PPU communication as shown in FIG. 4B, or some combination of PPU-to-PPU and PPU-to-CPU, when the CPU 430 also includes one or more NVLink 210 interfaces.

In an embodiment, the NVLink 210 allows direct load/store/atomic access from the CPU 430 to each PPU's 200 memory 204. In an embodiment, the NVLink 210 supports coherency operations, allowing data read from the memories 204 to be stored in the cache hierarchy of the CPU 430, reducing cache access latency for the CPU 430. In an embodiment, the NVLink 210 includes support for Address Translation Services (ATS), allowing the PPU 200 to directly access page tables within the CPU 430. One or more of the NVLinks 210 may also be configured to operate in a low-power mode.

Figure 4C:
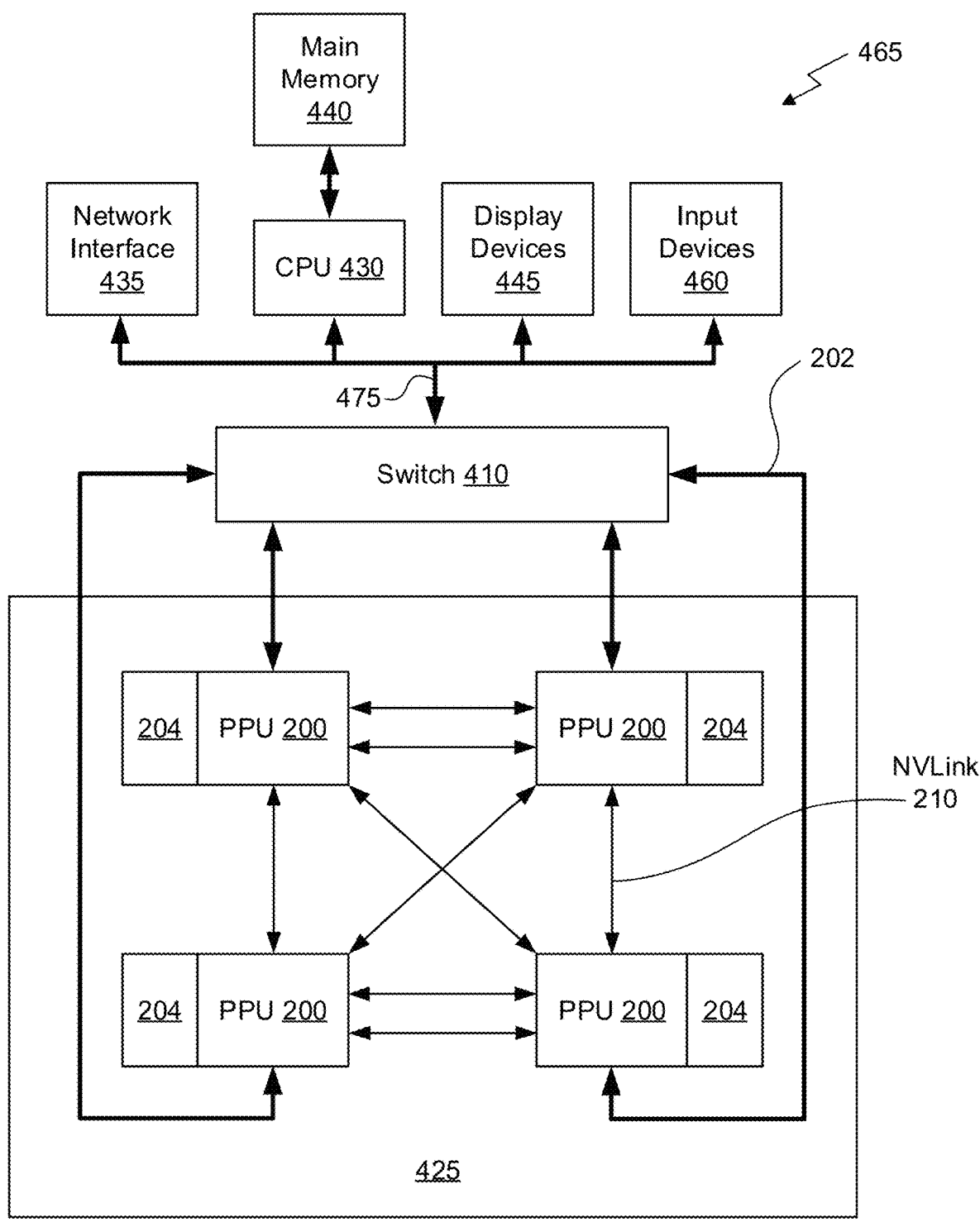
FIG. 4C illustrates an exemplary system in which the various architecture and/or functionality of the various previous embodiments may be implemented.

FIG. 4C illustrates an exemplary system 465 in which the various architecture and/or functionality of the various previous embodiments may be implemented. The exemplary system 465 may be configured to implement the method 100 shown in FIG. 1.

As shown, a system 465 is provided including at least one central processing unit 430 that is connected to a communication bus 475. The communication bus 475 may be implemented using any suitable protocol, such as PCI (Peripheral Component Interconnect), PCI-Express, AGP (Accelerated Graphics Port), HyperTransport, or any other bus or point-to-point communication protocol(s). The system 465 also includes a main memory 440. Control logic (software) and data are stored in the main memory 440 which may take the form of random access memory (RAM).

The system 465 also includes input devices 460, the parallel processing system 425, and display devices 445, i.e. a conventional CRT (cathode ray tube), LCD (liquid crystal display), LED (light emitting diode), plasma display or the like. User input may be received from the input devices 460, e.g., keyboard, mouse, touchpad, microphone, and the like. Each of the foregoing modules and/or devices may even be situated on a single semiconductor platform to form the system 465. Alternately, the various modules may also be situated separately or in various combinations of semiconductor platforms per the desires of the user.

Further, the system 465 may be coupled to a network (e.g., a telecommunications network, local area network (LAN), wireless network, wide area network (WAN) such as the Internet, peer-to-peer network, cable network, or the like) through a network interface 435 for communication purposes.

The system 465 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 440 and/or the secondary storage. Such computer programs, when executed, enable the system 465 to perform various functions. The memory 440, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 465 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Graphics Processing Pipeline

In an embodiment, the PPU 200 comprises a graphics processing unit (GPU). The PPU 200 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 200 can be configured to process the graphics primitives to generate a frame buffer (i.e., pixel data for each of the pixels of the display).

An application writes model data for a scene (i.e., a collection of vertices and attributes) to a memory such as a system memory or memory 204. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 340 of the PPU 200 including one or more of a vertex shader, hull shader, domain shader, geometry shader, and a pixel shader. For example, one or more of the SMs 340 may be configured to execute a vertex shader program that processes a number of vertices defined by the model data. In an embodiment, the different SMs 340 may be configured to execute different shader programs concurrently. For example, a first subset of SMs 340 may be configured to execute a vertex shader program while a second subset of SMs 340 may be configured to execute a pixel shader program. The first subset of SMs 340 processes vertex data to produce processed vertex data and writes the processed vertex data to the L2 cache 360 and/or the memory 204. After the processed vertex data is rasterized (i.e., transformed from three-dimensional data into two-dimensional data in screen space) to produce fragment data, the second subset of SMs 340 executes a pixel shader to produce processed fragment data, which is then blended with other processed fragment data and written to the frame buffer in memory 204. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

Figure 5:
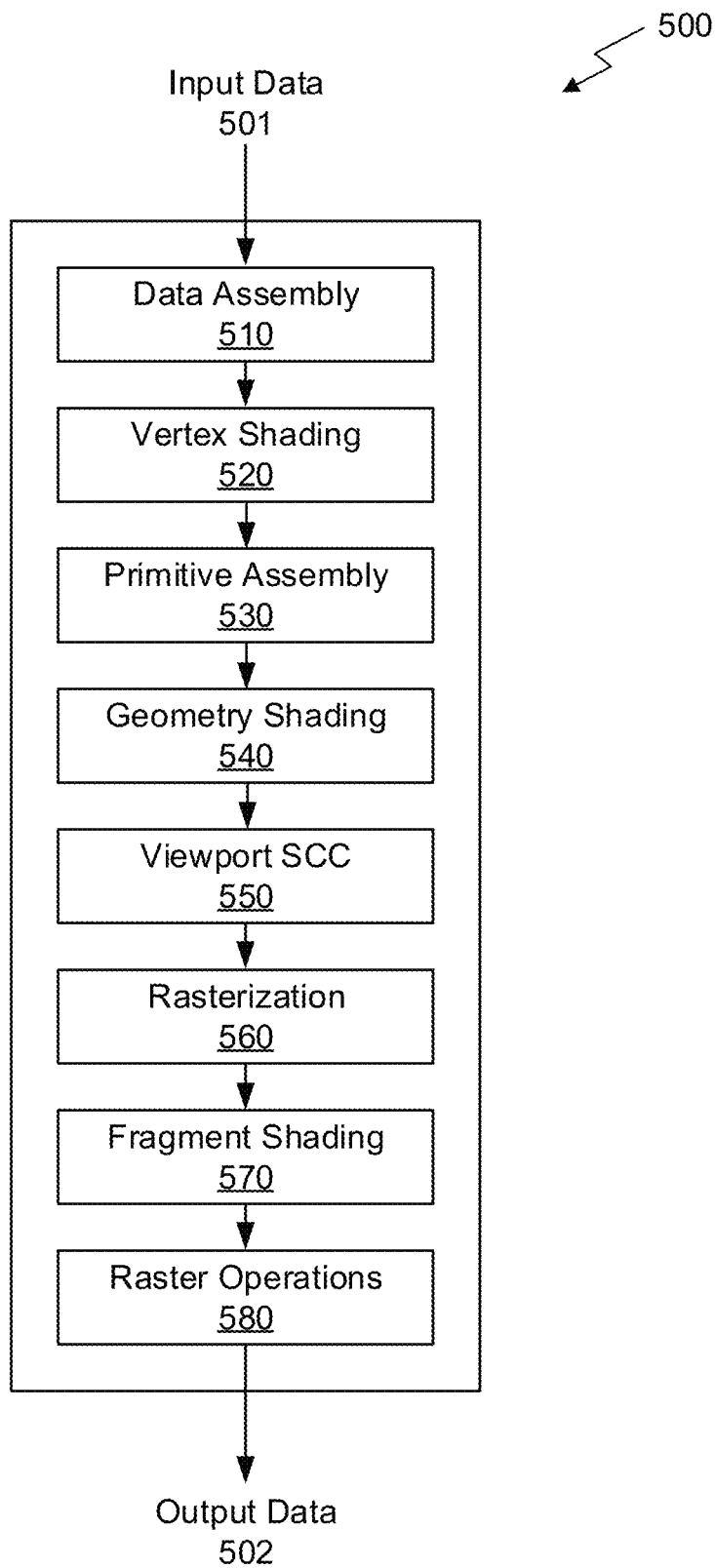
FIG. 5 is a conceptual diagram of a graphics processing pipeline implemented by the PPU of FIG. 2, in accordance with an embodiment of the presently described inventive concepts.

FIG. 5 is a conceptual diagram of a graphics processing pipeline 500 implemented by the PPU 200 of FIG. 2, in accordance with an embodiment. The graphics processing pipeline 500 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 500 receives input data 501 that is transmitted from one stage to the next stage of the graphics processing pipeline 500 to generate output data 502. In an embodiment, the graphics processing pipeline 500 may represent a graphics processing pipeline defined by the OpenGL® API. As an option, the graphics processing pipeline 500 may be implemented in the context of the functionality and architecture of the previous Figures and/or any subsequent Figure(s).

As shown in FIG. 5, the graphics processing pipeline 500 comprises a pipeline architecture that includes a number of stages. The stages include, but are not limited to, a data assembly stage 510, a vertex shading stage 520, a primitive assembly stage 530, a geometry shading stage 540, a viewport scale, cull, and clip (SCC) stage 550, a rasterization stage 560, a fragment shading stage 570, and a raster operations stage 580. In an embodiment, the input data 501 comprises commands that configure the processing units to implement the stages of the graphics processing pipeline 500 and geometric primitives (e.g., points, lines, triangles, quads, triangle strips or fans, etc.) to be processed by the stages. The output data 502 may comprise pixel data (i.e., color data) that is copied into a frame buffer or other type of surface data structure in a memory.

The data assembly stage 510 receives the input data 501 that specifies vertex data for high-order surfaces, primitives, or the like. The data assembly stage 510 collects the vertex data in a temporary storage or queue, such as by receiving a command from the host processor that includes a pointer to a buffer in memory and reading the vertex data from the buffer. The vertex data is then transmitted to the vertex shading stage 520 for processing.

The vertex shading stage 520 processes vertex data by performing a set of operations (i.e., a vertex shader or a program) once for each of the vertices. Vertices may be, e.g., specified as a 4-coordinate vector (i.e., <x, y, z, w>) associated with one or more vertex attributes (e.g., color, texture coordinates, surface normal, etc.). The vertex shading stage 520 may manipulate individual vertex attributes such as position, color, texture coordinates, and the like. In other words, the vertex shading stage 520 performs operations on the vertex coordinates or other vertex attributes associated with a vertex. Such operations commonly including lighting operations (i.e., modifying color attributes for a vertex) and transformation operations (i.e., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 520 generates transformed vertex data that is transmitted to the primitive assembly stage 530.

The primitive assembly stage 530 collects vertices output by the vertex shading stage 520 and groups the vertices into geometric primitives for processing by the geometry shading stage 540. For example, the primitive assembly stage 530 may be configured to group every three consecutive vertices as a geometric primitive (i.e., a triangle) for transmission to the geometry shading stage 540. In some embodiments, specific vertices may be reused for consecutive geometric primitives (e.g., two consecutive triangles in a triangle strip may share two vertices). The primitive assembly stage 530 transmits geometric primitives (i.e., a collection of associated vertices) to the geometry shading stage 540.

The geometry shading stage 540 processes geometric primitives by performing a set of operations (i.e., a geometry shader or program) on the geometric primitives. Tessellation operations may generate one or more geometric primitives from each geometric primitive. In other words, the geometry shading stage 540 may subdivide each geometric primitive into a finer mesh of two or more geometric primitives for processing by the rest of the graphics processing pipeline 500. The geometry shading stage 540 transmits geometric primitives to the viewport SCC stage 550.

In an embodiment, the graphics processing pipeline 500 may operate within a streaming multiprocessor and the vertex shading stage 520, the primitive assembly stage 530, the geometry shading stage 540, the fragment shading stage 570, and/or hardware/software associated therewith, may sequentially perform processing operations. Once the sequential processing operations are complete, in an embodiment, the viewport SCC stage 550 may utilize the data. In an embodiment, primitive data processed by one or more of the stages in the graphics processing pipeline 500 may be written to a cache (e.g. L1 cache, a vertex cache, etc.). In this case, in an embodiment, the viewport SCC stage 550 may access the data in the cache. In an embodiment, the viewport SCC stage 550 and the rasterization stage 560 are implemented as fixed function circuitry.

The viewport SCC stage 550 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (i.e., discarded) because the geometric primitive will not contribute to the final rendered scene. Any geometric primitive that is partially inside the viewing frustum and partially outside the viewing frustum may be clipped (i.e., transformed into a new geometric primitive that is enclosed within the viewing frustum. Furthermore, geometric primitives may each be scaled based on a depth of the viewing frustum. All potentially visible geometric primitives are then transmitted to the rasterization stage 560.

The rasterization stage 560 converts the 3D geometric primitives into 2D fragments (e.g. capable of being utilized for display, etc.). The rasterization stage 560 may be configured to utilize the vertices of the geometric primitives to setup a set of plane equations from which various attributes can be interpolated. The rasterization stage 560 may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization stage 560 generates fragment data (i.e., interpolated vertex attributes associated with a particular sample location for each covered pixel) that are transmitted to the fragment shading stage 570.

The fragment shading stage 570 processes fragment data by performing a set of operations (i.e., a fragment shader or a program) on each of the fragments. The fragment shading stage 570 may generate pixel data (i.e., color values) for the fragment such as by performing lighting operations or sampling texture maps using interpolated texture coordinates for the fragment. The fragment shading stage 570 generates pixel data that is transmitted to the raster operations stage 580.

The raster operations stage 580 may perform various operations on the pixel data such as performing alpha tests, stencil tests, and blending the pixel data with other pixel data corresponding to other fragments associated with the pixel. When the raster operations stage 580 has finished processing the pixel data (i.e., the output data 502), the pixel data may be written to a render target such as a frame buffer, a color buffer, or the like.

It will be appreciated that one or more additional stages may be included in the graphics processing pipeline 500 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 540). Other types of graphics processing pipelines are contemplated as being within the scope of the present disclosure. Furthermore, any of the stages of the graphics processing pipeline 500 may be implemented by one or more dedicated hardware units within a graphics processor such as PPU 200. Other stages of the graphics processing pipeline 500 may be implemented by programmable hardware units such as the SM 340 of the PPU 200.

The graphics processing pipeline 500 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the PPU 200. The API provides an abstraction for a programmer that lets a programmer utilize specialized graphics hardware, such as the PPU 200, to generate the graphical data without requiring the programmer to utilize the specific instruction set for the PPU 200. The application may include an API call that is routed to the device driver for the PPU 200. The device driver interprets the API call and performs various operations to respond to the API call. In some instances, the device driver may perform operations by executing instructions on the CPU. In other instances, the device driver may perform operations, at least in part, by launching operations on the PPU 200 utilizing an input/output interface between the CPU and the PPU 200. In an embodiment, the device driver is configured to implement the graphics processing pipeline 500 utilizing the hardware of the PPU 200.

Various programs may be executed within the PPU 200 in order to implement the various stages of the graphics processing pipeline 500. For example, the device driver may launch a kernel on the PPU 200 to perform the vertex shading stage 520 on one SM 340 (or multiple SMs 340). The device driver (or the initial kernel executed by the PPU 300) may also launch other kernels on the PPU 300 to perform other stages of the graphics processing pipeline 500, such as the geometry shading stage 540 and the fragment shading stage 570. In addition, some of the stages of the graphics processing pipeline 500 may be implemented on fixed unit hardware such as a rasterizer or a data assembler implemented within the PPU 300. It will be appreciated that results from one kernel may be processed by one or more intervening fixed function hardware units before being processed by a subsequent kernel on an SM 340.

Machine Learning

Deep neural networks (DNNs) developed on processors, such as the PPU 200 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it to get smarter and more efficient at identifying basic objects, occluded objects, etc., while also assigning context to objects.

At the simplest level, nodes evaluate, at various inputs that are received, importance levels are assigned to each of these inputs, and output is passed on to other nodes to act upon. A neural unit or perceptron is the most basic model of a neural network. In one example, a perceptron may receive one or more inputs that represent various features of an object that the perceptron is being trained to recognize and classify, and each of these features is assigned a certain weight based on the importance of that feature in determining defining particular aspects of the input, e.g., the shape of an object for input comprising image data.

A deep neural network (DNN) model includes multiple layers of many connected perceptrons (e.g., nodes) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 200. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 200 is a computing platform capable of delivering performance required for deep neural network-based artificial intelligence and machine learning applications.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 200 of FIG. 2—e.g., each device may include similar components, features, and/or functionality of the computing device(s) 200.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 200 described herein with respect to FIG. 2. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

Graph Neural Networks for Channel Decoding

Overview

In a general sense, graph neural networks (GNNs) are neural networks that operate on graph data, which may represent various types of information, including but not limited to text, image data, chemical structures and functions, social network structures, citation networks, machine learning models, programming code, mathematical equations, etc. as would be understood by a person having ordinary skill in the art upon reading the present disclosure. Although in no way so limited, for illustrative purposes the present descriptions convey the inventive concepts of a graph neural network in the context of channel decoding, e.g., for purposes of performing parity check(s).

Graph data is represented by a graph structure indicating relations (edges) between a collection of entities (nodes). The graph, in turn, may be described according to various types of attributes, including vertex (or node) attributes such as node identity, number of neighbors, etc.; edge attributes (and/or directions), such as edge identity, edge weight, etc.; and global (or master node) attributes, such as connectivity of the graph, total number of nodes in the graph, longest path in the graph, etc. as known in the art. According to various embodiments, graph data may be represented in the form of a matrix.

GNN-Based Message Passing Neural Network for Bipartite Graphs

In operation, a GNN is an optimizable transformation on all attributes of a graph (e.g., node attributes, edge attributes, global-context attributes, etc.) that preserves graph symmetries. In various embodiments, the presently disclosed inventive concepts may leverage a modified "message passing" neural network framework specifically configured for advantageous performance with respect to channel decoding, as described above.

Again, in the context of channel decoding, an exemplary GNN may adopt a "graph-in, graph-out" architecture that accepts a graph as input, with information loaded onto nodes, edges, and/or global context of the graph. The GNN may progressively transform such information, preferably without changing the connectivity of the graph, e.g., in order to predict the value of codeword bit(s) for parity checking.

For instance, consider a binary linear block code C of length n that can be described by a binary parity check matrix $H^{(n-k) \times n} \in F_2^{(n-k) \times n}$, where each codeword represents k information bits.

A binary vector is a codeword $c \in F_2^n$ of C, if and only if in GF(2) it holds that $Hc^T = 0$. For the additive white Gaussian noise (AWGN) channel with noise variance $\sigma_{ch}^2$ and binary phase shift keying (BPSK) modulation $x = -2c+1$, the receiver observes $y = x+n$, with $n \sim N(0, \sigma_{ch}^2 I)$. After demapping, the log-likelihood ratio (LLR) of the $i^{th}$ codeword bit $c_i$ is given as $$l_{ch,i} = \log \frac{p(c_i = 1)}{p(c_i = 0)} = -\frac{2y_i}{\sigma_{ch}^2} \quad (1)$$

and $l_{ch}$ denotes the vector of all n channel log likelihood ratios (LLRs) and $y_i$ denotes the $i^{th}$ element of y.

Figures 6A, 6B:
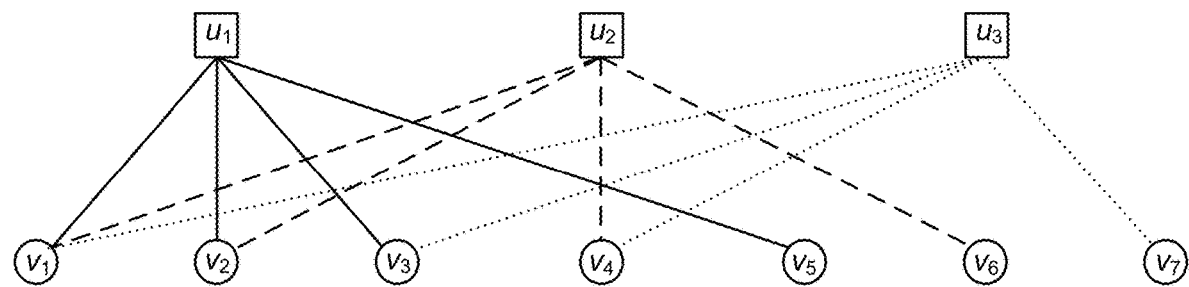
FIG. 6A depicts an exemplary binary parity-check matrix H, according to one aspect of the presently described inventive concepts.
FIG. 6B shows a simplified bipartite graph corresponding to the binary parity-check matrix H shown in FIG. 6A, according to another aspect of the inventive concepts presented herein.

By interpreting H as bipartite graph, a decoding graph for message passing decoding emerges. As illustrated in FIGS. 6A-6B, each row of H represents a single parity check (so-called constraint or check node (CN), as represented by factor nodes $u_1$, $u_2$, and $u_3$ of the graph structure shown in FIG. 6B) and each column represents a codeword position (so-called variable node (VN), as represented by variable nodes $v_1$, $v_2$, $v_3$, $v_4$, $v_5$, $v_6$, and $v_7$ of FIG. 6B). As shown in FIG. 6B, correspondence between individual $u_1$, $u_2$, and $u_3$ and variable nodes $v_1$, $v_2$, $v_3$, $v_4$, $v_5$, $v_6$, and $v_7$ are represented by solid lines (regarding $u_1$), dashed lines (regarding $u_2$) and dotted lines (regarding $u_3$). For finite length, BP decoding is known to be suboptimal due to cycles in the decoding graph (owing to lack of any tree structure).

The matrix H as understood herein possesses several interesting properties. Namely, H is not unique and can be modified (e.g., by the linear combination of rows), i.e., multiple graphs can be assigned to the same code. H can be also overcomplete, i.e., more than n−k rows can be part of H, which are then linearly dependent. The set of all $2^k$ codewords c defines the code C. However, for a linear code, the code is fully defined by k linearly independent codewords. Finally, for a linear code, the all-zero codeword $c=0$ is always part of the code as $H0^T = 0$.

We turn now to an exemplary bipartite GNN-based message passing decoding algorithm for a given parity-check matrix H. Let $f^F(x, \theta_{NN})$ denote a parametrized function that maps $f^F: x \to R^F$, and can be parametrized by the weights $\theta_{NN}$ (e.g., for the case of simple multilayer perceptrons (MLPs), though skilled artisans will appreciate other options are possible upon reading the present disclosure). Note that the superscript $F \in \mathbb{N}$ defines the dimensionality of the messages.

Referring now to FIGS. 7-8 and according to various exemplary implementations of the presently disclosed inventive concepts, operation on a bipartite graph may utilize any combination or permutation of the following nodes, functions, and/or attributes.

Regarding nodes, each variable node (VN) $v_i$, $v_k$, etc. may be considered representative of a transmitted codeword bit $c_i$, while V denotes the set of all variable nodes in the graph. In similar manner, each factor node (FN) $u_j$ represents one of n−k node constraints, and U denotes the set of all factor nodes in the graph. Similarly, $V(u_j)$ denotes the neighborhood of $u_j$, i.e., the set of all variable nodes directly connected to factor node $u_j$, and $U(v_i)$ denotes the neighborhood of $v_i$, i.e., the set of all factor nodes directly connected to variable node $v_i$.

Regarding node values, each node may compute an $F_n$-dimensional vector $h_{v_i}$, $h_{u_j} \in R^{F_n}$ for each variable node $v_i$ and factor node $u_j$, respectively.

Regarding edge values, particularly directed edge values, each (preferably directed) edge message has an assigned $F_m$-dimensional value $m_{v_i \to u_j}$, $m_{u_j \to v_i} \in R^{F_m}$ for each variable node $v_i$ and factor node $u_j$, respectively. Generally, though not necessarily, these values are different for each direction. Furthermore, $\varepsilon$ denotes the set of all edges $e_{i,j} = (v_i; u_j)$ in the graph, i.e., $e_{i,j} = (v_i; u_j) \in |\varepsilon| \leftrightarrow H_{j,i} = 1$.

Now turning to attributes, according to various embodiments node(s) can have an assigned node attribute $g_{v_i}$, $g_{u_j} \in R^{F_{na}}$ for VN and FN, respectively. This property may be node specific, e.g., a total of $|V|+|U|=2n-k$ node attributes may exist. Similarly, edge(s) can have an assigned edge attribute $$g m_{v_i \to u_j}, g m_{u_i \to v_j}$$

∈ $R^{F_{ma}}$, respectively. This property may be edge specific, and/or depend on the edge direction, i.e., in total $2|\mathcal{E}|$ edge attributes may exist.

Turning now to functions, exemplary functions may generally represent bipartite graphs as message passing neural networks, and preferably two exemplary trainable functions may be implemented individually or in combination, according to various embodiments.

First, an edge message update function may be employed to update message values from VN $v_i$ to FN $u_j$. The update values may be calculated according to Equation (2).

$$m_{v_i \to u_j} = f^{F_m}\left(\left[h_{v_i} \| h_{u_j} \| g_{m_{v_i \to u_j}}\right], \theta_{m_{v \to u}}\right) \quad (2)$$

where $\theta_{m_{v \to u}}$ denotes the trainable parameters of the node update and $[x\|y]$ denotes the concatenation of the vectors x and y. Preferably, the same weights $\theta_{m_{v \to u}}$ are applied to all edges.

Similarly, updated message values from FN $u_j$ to VN $v_i$ may be calculated according to Equation (3).

$$m_{u_j \to v_i} = f^{F_m}\left(\left[h_{u_j} \| h_{v_i} \| g_{m_{u_j \to v_i}}\right], \theta_{m_{u \to v}}\right) \quad (3)$$

with $\theta_{m_{u \to v}}$ denoting another (shared) set of trainable parameters.

Updated node values for VN $v_i$ may be calculated according to Equation (4), according to preferred approaches.

$$h'_{v_i} = f^{F_n}\left(\left[h_{v_i} \Big\| \bigoplus_{u_j \in \mathcal{U}(v_i)} m_{u_j \to v_i} \Big\| g_{v_i}\right], \theta_v\right) \quad (4)$$

with $\theta_v$ being the (shared) parameters of the VN update function and $\oplus$ denotes a message aggregation function. Throughout this disclosure, and according to various embodiments, the sum or the mean operator may be employed for the message aggregation function $\oplus$. In addition, preferably the aggregation function is permutation invariant, i.e., invariant to the order in which incoming messages are processed.

According to further embodiments, updated node values for FN may be calculated according to Equation (5).

$$h'_{u_j} = f^{F_n}\left(\left[h_{v_i} \Big\| \bigoplus_{v_i \in \mathcal{V}(u_j)} m_{u_j \to v_i} \Big\| g_{v_i}\right], \theta_u\right) \quad (5)$$

where $\theta_u$ are the trainable parameters of the FN update.

The inventive approach to channel decoding involves initializing $h_u=0$ and applying a linear input embedding $h_{v_i}=l_{ch,i} \times w$, where $w \in R^{F_n}$ is a trainable parameter that projects the scalar $l_{ch,i}$ to an $F_n$-dimensional space. After decoding, a final estimate is given by $l_i=q^T h_{v_i}$, where $q \in R^{F_n}$ is another trainable vector. Advantageously, projecting messages to higher dimensions can simplify processing due to the so-called "blessing of dimensionality."

According to several embodiments, node and message updates are performed iteratively until reaching a maximum of $N_{iter}$ iterations. Moreover, flooding scheduling may be employed according to certain implementations, where Equation (2) is applied to all messages in the same time step (the same holds for the other updates according to Equations (3)-(5)).

An additional advantage of employing the presently described inventive approaches is that the number of trainable weights is relatively small compared to other known approaches, e.g., on the order of 10,000 weights or less as opposed to millions of weights. For instance, an exemplary embodiment configured for BCH GNN-based decoding is fully defined by 9,640 parameters. Moreover, computational complexity scales linearly with n.

The foregoing aspects of the inventive GNN-based decoding architecture are presented algorithmically in FIG. 8, according to a particularly preferred implementation.

Training Methodology

According to preferred embodiments, the presently disclosed inventive GNN-based decoding schemes may be trained using an iterative, loop-unrolling approach. For example, all weights may use a Glorot uniform initializer while node and edge attributes are set to a value of zero. A binary cross-entropy (BCE) loss function may be implemented as multi-loss over all iterations, e.g., according to Equation (6).

$$L = -\frac{1}{n \cdot N_{iter}} \sum_{it=0}^{N_{iter}-1} \sum_{i=0}^{n-1} c_i \log(\sigma(l_i^{it})) + (1-c_i)\log(1-\sigma(l_i^{it})) \quad (6)$$

where the superscript it denotes the decoder output l of the $it^{th}$ iteration. As can be seen from FIG. 9, this allows for inference of the trained decoder with a variable number of iterations and enables the possibility of early stopping.

In a preferred implementation, standard stochastic gradient descent (SGD)-based training with the Adam optimizer may be utilized. In such embodiments, the batch size can be (relatively) small, as the same weights are applied to all nodes. This effectively multiplies the batch size by $|\mathcal{U}|$ and $|\mathcal{V}|$, respectively (and $|\mathcal{E}|$ for the message updates). The exemplary SGD-based training benefits from availability of an encoder, as all-zero codeword based training is not generally practicable. Thus, new random codewords may be drawn for every SGD iteration.

As the design space of the hyperparameters is virtually infinite, we have utilized a hyperparameter search and, therefore, evaluated 436 different models. Table 1 summarizes the search space and best hyperparameters, as determined experimentally according to several embodiments of the inventive concepts described herein. For the simulated BCH code, we did not observe any gains by having edge and node attributes and, thus, set these parameters to 0. However, it is instructive to realize that the weights of the node and message update functions are shared between all nodes (and all iterations). Thus, learning edge (or node) specific properties of a specific graph (e.g., learning to remove short cycles) requires the availability of these attributes.

TABLE 1

Exemplary hyperparameter search for (63, 45) BCH code

| Parameter | Search Space | Best |
|---|---|---|
| Activation | {ReLU, sigmoid, tanh} | tanh |
| $N_{iter}$ | 1-20 | 8 |
| $F_n$ | 1-32 | 20 |
| $F_m$ | 1-32 | 20 |
| # of hidden units (MLP) | 4-128 | 40 |
| # of MLP layers | 1-4 | 2 |

TABLE 1-continued

Exemplary hyperparameter search for (63, 45) BCH code

| Parameter | Search Space | Best |
|---|---|---|
| Aggregation function | {mean, sum} | Mean |
| LLR clipping | {10, 16, 20, ∞} | ∞ |
| Learning rate | — | $10^{-3} - 10^{-5}$ |
| Batch size | — | 256 |

Figure 9:
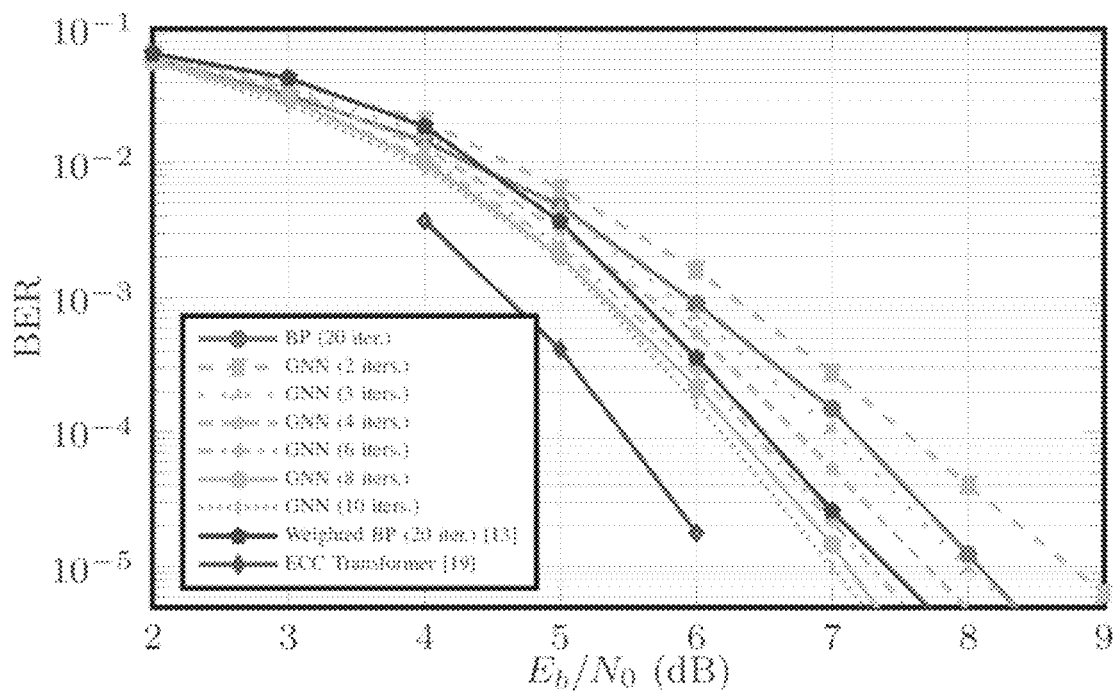
FIG. 9 is a simplified graph showing bit error rate (BER) performance of a graph neural network trained to decode Bose-Chaudhuri-Hocquenghem (BCH) codes relative to BER performance of a belief propagation (BP) decoding scheme, according to several embodiments of the presently disclosed inventive concepts.

As reflected in Table 1 and FIG. 9, tan h often outperforms ReLU and logistic sigmoid activation, particularly for small MLP sizes. In addition, experimental evaluation revealed several architectures with similar BER performance as shown in FIG. 9, with some being characterized by greater depth (more layers but fewer weights) and others by greater width (fewer layers, but greater number of weights per update). Skilled artisans will thus appreciate, upon reading the present disclosure, that the inventive concepts presented herein convey additional degree(s) of freedom for design and optimization in various applications.

Moreover, as the mean aggregation function tends to exhibit better BER performance than the sum aggregation, stability improves when changing the number of iterations after performing training.

Further still, in embodiments featuring punctured nodes (e.g., as caused by rate-matching or other known circumstances) deactivating bias in MLP layers for node/edge update functionality improves the stability for exact zero input LLR messages, as doing so yields an all-zero output.

GNN-Based Decoding for Non-Binary Codes

While conventional decoding schemes are limited to input consisting of binary code, the presently described inventive GNN-based decoding techniques may be extended to operate with non-binary codes, allowing for much more diverse utility beyond, e.g., binary parity check applications. The following descriptions set forth one exemplary embodiment of a GNN-based decoder configured for operation with non-binary code input, for example, a set of probability vectors as described in greater detail below. Those having ordinary skill in the art will appreciate that other non-binary inputs (though preferably in the form of vectors, e.g., feature vectors) may be utilized without departing from the scope of the presently described inventive concepts.

Assuming that the entries of input matrix H are members of the Galois field GF(q=p$^m$), where p is a prime number, m a positive integer and the field is denoted as $F_q$, the exemplary encoder applies encoding such that a codeword c∈ $F_q^n$ of length n fulfills Hc'=0 in GF(q).

For transmission, c can be mapped into a binary representation, or a non-binary channel can be used (e.g., higher order modulation or solid state drives). In any case, a demapper preferably utilizes a probability vector $p_{ch}(c_k|y_k)$ of size q for each transmitted symbol $c_k$, where $y_k$ denotes the channel observation for the transmitted symbol $c_k$.

According to one embodiment, depicted algorithmically in FIG. 12, the proposed GNN-decoder can be adjusted for non-binary codes as follows:

First, the decoding graph is preferably extracted from H in the same way as described above regarding bipartite graph neural network frameworks, however, every non-zero element of H is considered as a connection between variable and factor nodes (i.e., an edge).

In addition, the input of the decoder is the probability vector $p_{ch}(c_k|y_k)$ of each possible element in $F_q$, i.e., having or consisting of q values, in various approaches. The input/output transformations are preferably given by (trainable) matrices of size W∈ $\mathbb{R}^{F_n \times q}$ and Q∈ $\mathbb{R}^{q \times F_n}$.

Further still, for training, the categorical cross-entropy loss as shown in Equation (7) is preferably used.

$$L = -\frac{1}{n \cdot N_{iter}} \sum_{it=0}^{N_{iter}-1} \sum_{i=0}^{n-1} c_i \log([\hat{p}(c_i \mid y)_k]) \quad (7)$$

where $p_{ch}(c_k|y_k)_k$ denotes the $k^{th}$ element of the decoder's output, and k is the (ground truth) index of the transmitted symbol $c_i$, i.e., $c_i$ is the $k^{th}$ element in $F_q$.

After the iterative decoding process is complete, variable node values are preferably projected back to probability vectors.

The algorithm could also operate in the log-domain where the input and output are implemented, e.g., as log its according to certain implementations.

Decoding Performance

BCH Codes

FIG. 9 shows the BER performance for the learned (63,45) BCH decoder. The GNN hyperparameters are provided in Table 1. It is worth mentioning that BP decoding of BCH codes is known to be highly suboptimal due to the high density of H. Nonetheless, it has become a common benchmark to decode the (63,45) BCH code, and serves as a suitable point of comparison to evaluate performance of the presently described GNN-based decoding approaches. The sub-optimality of BCH provides an interesting playground for GNN experiments as—in contrast to well-designed LDPC codes—BER performance gains when compared to BP are still possible. One of the currently best learned decoders requires a number of trainable parameters is 2-3 orders of magnitude larger compared to the presently disclosed inventive GNN-based decoder.

Although the decoder is trained for a fixed number of decoding iterations $N_{iter}$=8, the results in FIG. 9 show that the same weights can be used for a variable number of iterations, e.g., for $N_{iter}$={2; 3; 4; 6; 8; 10} (with a degraded performance for fewer iterations, as is the expected behavior). This allows for the implementation of early stopping at any time.

However, surprisingly, these experiments revealed that a GNN-based decoder according to the present disclosure, with only three decoding iterations, achieves a similar BER performance when compared to the conventional BP decoder with 20 iterations.

Regular LDPC Codes

Figure 10:
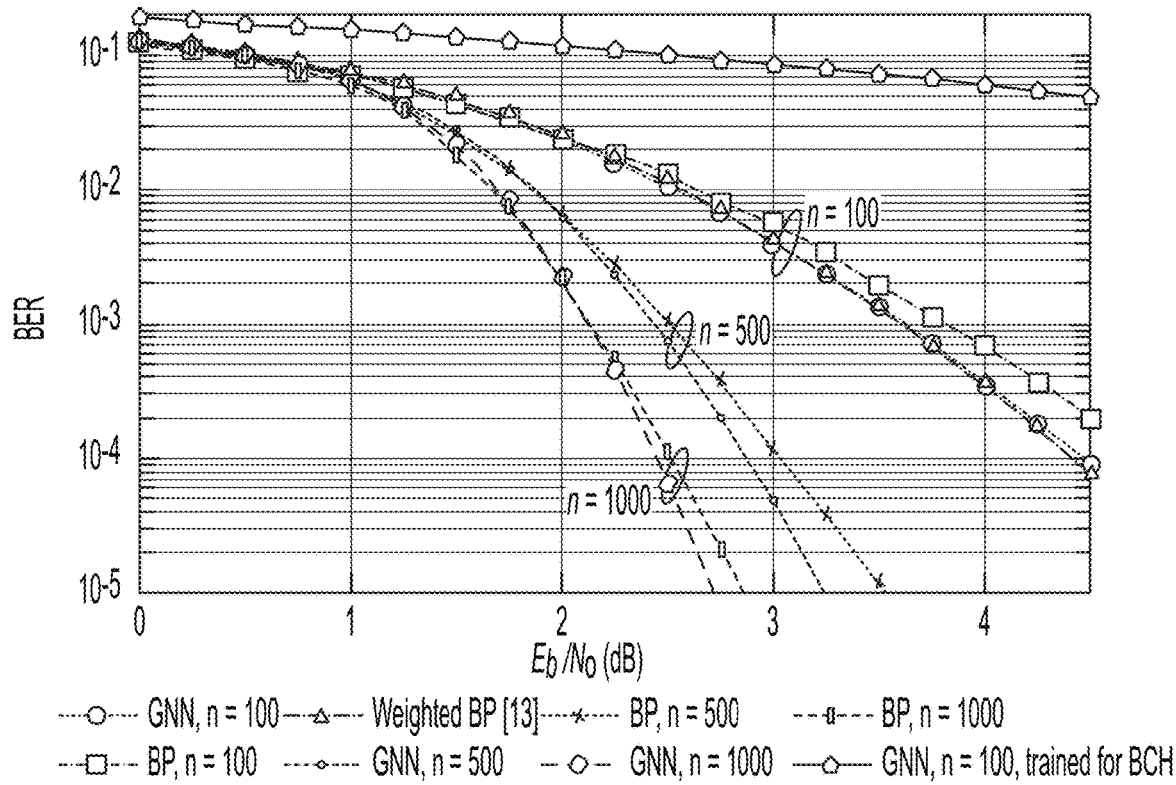
FIG. 10 is a simplified graph showing bit error rate (BER) performance of a graph neural network trained to decode low-density parity-check (LDPC) code relative to BER performance of a belief propagation (BP) decoding schemes, according to further embodiments of the presently disclosed inventive concepts.

To further investigate the scalability, one experimental embodiment includes training the GNN to decode regular (v=3; c=6) LDPC codes with VN degree v and CN degree c. The parity-check matrix is randomly constructed and not further optimized for BP decoding. However, the same parity-check matrix is used for both decoders. The results are shown in FIG. 10. Note that the GNN is trained for a codeword length of n=100 and $N_{iter}$=10 iterations. For faster training convergence and to avoid another expensive hyperparameter optimization, the NN dimensions may be increased, e.g., to approximately 28,700 trainable weights. As can be seen, the GNN decoder slightly outperforms BP decoding even for long codes which underlines the scalability of the GNN. However, the observed gains tend to diminish with increasing value of n. To investigate the impact of different graphs, the trained weights of the BCH decoder described hereinabove may be reused to decode the LDPC code. For such implementations, it is advantageous to replace the underlying graph structure but keep the weights from the previous training. As can be seen, the learned GNN decoder is not universal and benefits from re-training to adopt to the new code.

5G NR LDCP Codes

Figures 11A, 11B:
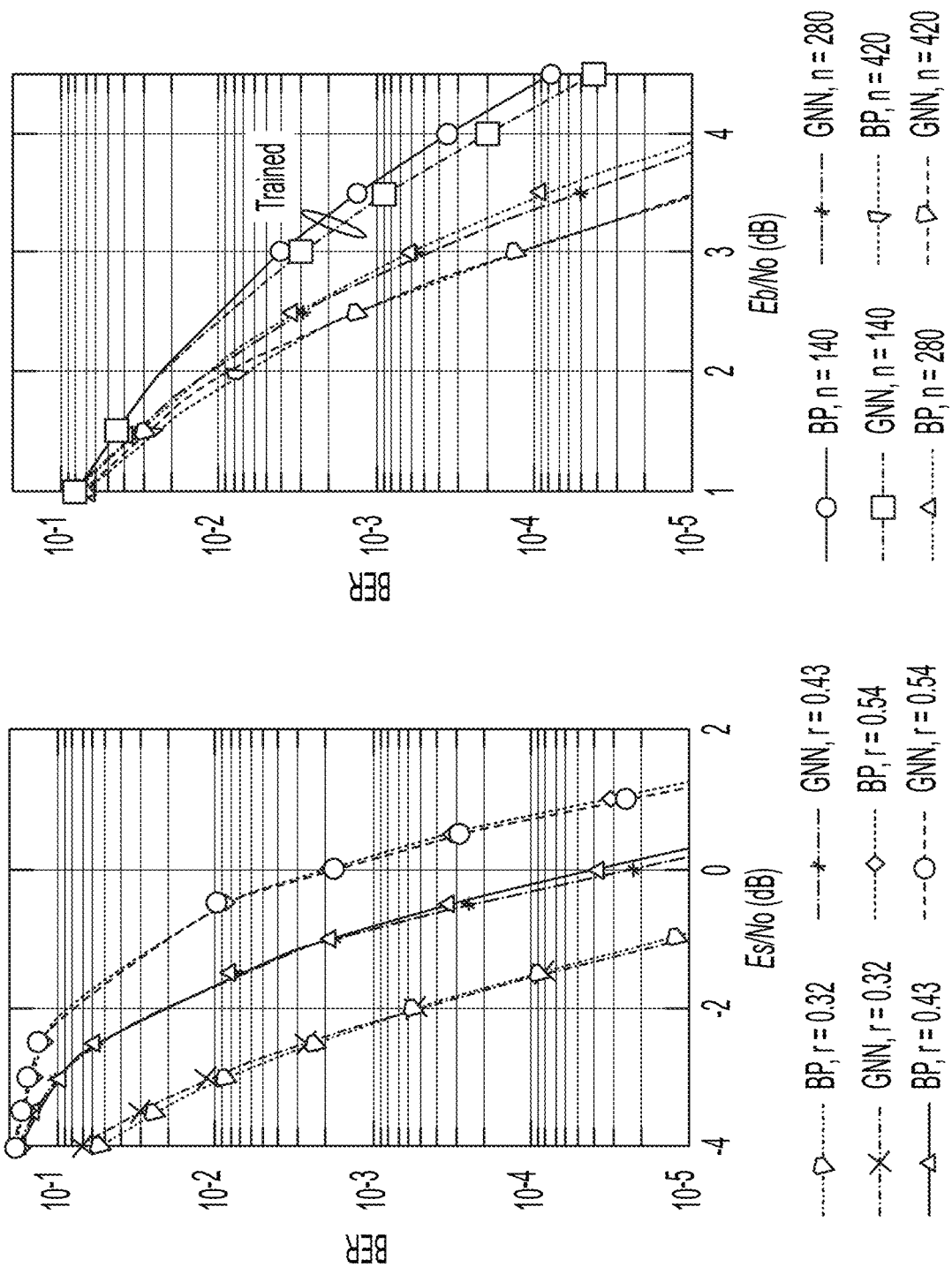
FIGS. 11A-11B are graphical depictions of bit error rate (BER) performance of a graph neural network trained to decode 5G NR low-density parity check (LDPC) code, according to exemplary embodiments of the inventive concepts presented herein.

Turning now to GNN-based decoding of the 5G NR LDPC code, which according to the exemplary embodiment described herein includes changing code word length after training by changing the lifting factor of the code. The experimentally evaluated GNN consists of 18,900 trainable weights, according to one embodiment. Results are shown in FIGS. 11A and 11B. As the 5G NR LDPC code inherently requires rate-matching, the GNN is preferably trained on the underlying (non-rate-matched) parity check matrix, and rate-matching is applied only for inference.

The rate-matching itself is not learned. This avoids that the first 2Z information bits are punctured during the training (where Z denotes the lifting factor of the code). Otherwise, we empirically observed instabilities during training through the rate-matching. The results in FIGS. 11A-11B show that both decoders achieve the same decoding performance for a wide range of code parameters and for the exact code parameters used for training even a small gain can be observed. Keep in mind that the 5G NR LDPC code is specifically optimized for BP decoding and the evaluation is done for the AWGN channel. Intuitively, there is only little room for improvement through deep learning for this optimal setting.

As shown in FIG. 11A, the same weights can be scaled to longer codeword lengths and the same flexibility can be also observed with respect to the code rate in FIG. 11B. This could enable a simplified training based on the underlying protograph of the LDPC code and only a few sets of different weights must be stored to support all possible code parameters of a given standard. However, training—in particular, when rate-matching is involved—may involve carefully adjusted hyperparameters which seem to be highly code specific. Note that both LDCP decoding algorithms use flooding scheduling for node updates, and the required number of iterations may change for a different scheduling.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method, comprising:
at a device:
receiving one or more codewords of a linear block code;
embedding the one or more received codewords into a higher-dimensional space; and
decoding the embedded codeword(s) using a graph neural network (GNN)-based decoder trained to decode linear block codes of arbitrary block length.

2. The method of claim 1, wherein the linear block code is a binary block code.

3. The method of claim 2, wherein an input to the GNN-based decoder comprises:
a plurality of log likelihood ratios (LLRs) corresponding to channel observations regarding the received codeword(s) of the linear block code; and
one or more trainable parameters.

4. The method of claim 3, wherein the one or more trainable parameters are selected from the group consisting of:
one or more factor node update parameters $\theta_u$, one or more variable node update parameters $\theta_v$, one or more variable to factor message update parameters $\theta_{m_{v \to u}}$, one or more factor to variable message update parameters $\theta_{m_{u \to v}}$, one or more factor node attribute parameters $\{g_{v_i}\} \forall v_i \in V$, one or more variable node attribute parameters $\{g_{vu_i}\} \forall u_j \in U$, one or more message attribute parameters $$\{g_{m_{v_i \to u_j}}, g_{m_{u_j \to v_i}}\},$$

$\forall_{(v_i, u_j)} \in \varepsilon$, an input embedding parameter w, an output embedding q, and combinations thereof.

5. The method of claim 4, wherein each variable node v represents a transmitted codeword bit of the linear block code;
wherein each factor node u denotes a node constraint;
wherein V denotes a set of all variable nodes in a bi-partite graph of a parity check matrix of the linear block code;
wherein U denotes a set of all factor nodes in the graph; and wherein ε denotes a set of all edges $e_{i,j}=(v_i; u_j)$ in the graph.

6. The method of claim 2, wherein decoding the received linear block code comprises:
  receiving or generating input comprising:
    a plurality of log likelihood ratios (LLRs) corresponding to channel observations regarding one or more bit values of the linear block code; and
    one or more trainable parameters;
  initializing graph nodes of the GNN-based decoder, wherein initializing the graph nodes comprises assigning a plurality of initial variable node values to a plurality of variable nodes based at least in part on the plurality of LLRs;
  iteratively decoding the received linear block code;
  computing one or more final variable node values based on the iterative decoding process;
  projecting the computed final variable node value(s) to final, scalar LLRs; and
  determining the one or more bit values of the linear block code based on the final, scalar LLRs.

7. The method of claim 6, wherein each decoding iteration comprises:
  updating one or more variable to factor node messages based at least in part on some or all of the one or more trainable parameters;
  updating one or more factor nodes based at least in part on some or all of the one or more trainable parameters;
  updating one or more factor to variable node messages based at least in part on some or all of the one or more trainable parameters; and
  updating one or more variable nodes based at least in part on some or all of the one or more trainable parameters.

8. The method of claim 2, wherein the GNN-based decoder is trained using iterative loop-unrolling for all iterations.

9. The method of claim 1, wherein the linear block code is a non-binary code.

10. The method of claim 9, wherein an input to the GNN-based decoder comprises:
  a plurality of probability vectors corresponding to transmitted codeword(s) of the linear block code; and
  one or more trainable parameters.

11. The method of claim 10, wherein each probability vector is defined by $p_{ch}(c_k|y) \in [0,1]^q$ for each transmitted codeword symbol $c_k$;
  wherein q denotes an order of a non-binary field $\mathbb{F}_q$ from which each transmitted symbol $c_k$ is taken;
  and wherein y denotes a vector representing all of the transmitted codeword symbols that were received at the device.

12. The method of claim 11, wherein each variable node v represents a transmitted codeword symbol of the linear block code;
  wherein each factor node u denotes a node constraint;
  wherein V denotes a set of all variable nodes in a bi-partite graph of a parity check matrix of the linear block code;
  wherein U denotes a set of all factor nodes in the graph; and
  wherein ε denotes a set of all edges $e_{i,j}=(v_i; u_j)$ in the graph.

13. The method of claim 10, wherein the one or more trainable parameters are selected from the group consisting of: one or more factor node update parameters $\theta_u$, one or more variable node update parameters $\theta_v$, one or more variable to factor message update parameters $\theta_{m_{v \to u}}$, one or more factor to variable message update parameters $\theta_{m_{u \to v}}$, one or more factor node attribute parameters $\{g_{v_i}\} \forall_{v_i} \in V$, one or more variable node attribute parameters $\{g_{vu_i}\} \forall_{u_j} \in U$, one or more message attribute parameters $$\{g_{m_{v_i \to u_j}}, g_{m_{u_j \to v_i}}\},$$

$\forall_{(v_i,u_j)} \in \varepsilon$, an output transformation $W \in \mathbb{R}^{F_n \times q}$, an output transformation $Q \in \mathbb{R}^{q \times F_n}$, and combinations thereof.

14. The method of claim 9, wherein decoding the received linear block code comprises:
  receiving or generating input comprising:
    a plurality of probability vectors corresponding to channel observations regarding one or more symbol values of the linear block code; and
    one or more trainable parameters;
  initializing graph nodes of the GNN-based decoder, wherein initializing the graph nodes comprises assigning a plurality of initial variable node values to a plurality of variable nodes based at least in part on the plurality of probability vectors;
  iteratively decoding the received linear block code, wherein each decoding iteration comprises:
    updating one or more variable to factor node messages;
    updating one or more factor nodes;
    updating one or more factor to variable node messages; and
    updating one or more variable nodes; and
  computing one or more final variable node values based on the iterative decoding process;
  projecting the computed final variable node value(s) to final probability vectors; and
  determining the one or more symbol values of the linear block code based on the final probability vectors.

15. The method of claim 14, wherein each decoding iteration comprises:
  updating one or more variable to factor node messages based at least in part on some or all of the one or more trainable parameters;
  updating one or more factor nodes based at least in part on some or all of the one or more trainable parameters;
  updating one or more factor to variable node messages based at least in part on some or all of the one or more trainable parameters; and
  updating one or more variable nodes based at least in part on some or all of the one or more trainable parameters.

16. The method of claim 9, wherein the GNN-based decoder is trained using categorical cross-entropy loss for all iterations.

17. A system, comprising:
  a non-transitory memory storage comprising instructions; and
  one or more processors in communication with the memory, wherein the one or more processors execute the instructions to:
    receive one or more codewords of a linear block code;
    embed the one or more received codewords into a higher-dimensional space; and
    decode the embedded codewords using a graph neural network (GNN)-based decoder trained to decode linear block codes of arbitrary block length.

18. The system of claim 17, wherein the linear block code is a binary block code, and wherein the GNN-based decoder is trained using iterative loop-unrolling for all iterations.

19. The system of claim 17, wherein the linear block code is a non-binary block code, and wherein the GNN-based decoder is trained using categorical cross-entropy loss for all iterations.

20. The system of claim 17, wherein decoding the received linear block code comprises:
receiving or generating input comprising:
either:
a plurality of log likelihood ratios (LLRs) corresponding to channel observations regarding one or more bit values of the linear block code; or a plurality of probability vectors corresponding to channel observations regarding one or more symbol values of the linear block code; and
one or more trainable parameters;
initializing graph nodes of the GNN-based decoder, wherein initializing the graph nodes comprises assigning a plurality of initial variable node values to a plurality of variable nodes based at least in part on the plurality of LLRs or the plurality of probability vectors;
iteratively decoding the received linear block code;
computing one or more final variable node values based on the iterative decoding process;
projecting the computed final variable node value(s) to either final, scalar LLRs or final probability vectors; and
determining the one or more bit values or symbol values of the linear block code based on either the final, scalar LLRs or the final probability vectors.

21. The system of claim 20, wherein each decoding iteration comprises:
updating one or more variable to factor node messages based at least in part on some or all of the one or more trainable parameters;
updating one or more factor nodes based at least in part on some or all of the one or more trainable parameters;
updating one or more factor to variable node messages based at least in part some or all of the one or more trainable parameters; and
updating one or more variable nodes based at least in part on some or all of the one or more trainable parameters.

22. A non-transitory computer readable media storing computer instructions which, when executed by one or more processors of a device, cause the device to:
receive codewords of a linear block code;
embed the received codewords into a higher-dimensional space; and
decode the said embedded codewords using a graph neural network (GNN)-based decoder trained to decode linear block codes of arbitrary block length.

23. The computer readable media of claim 22, wherein the linear block code is a binary block code, and wherein the GNN-based decoder is trained using iterative loop-unrolling for all iterations.

24. The computer readable media of claim 22, wherein the linear block code is a non-binary block code, and wherein the GNN-based decoder is trained using categorical cross-entropy loss for all iterations.

25. The computer readable media of claim 22, wherein decoding the received linear block code comprises:
receiving or generating input comprising:
either: a plurality of log likelihood ratios (LLRs) corresponding to channel observations regarding one or more bit values of the linear block code; or
a plurality of probability vectors corresponding to channel observations regarding one or more symbol values of the linear block code; and
one or more trainable parameters;
initializing graph nodes of the GNN-based decoder, wherein initializing the graph nodes comprises assigning a plurality of initial variable node values to a plurality of variable nodes based at least in part on the plurality of LLRs or the plurality of probability vectors;
iteratively decoding the received linear block code;
computing one or more final variable node values based on the iterative decoding process;
projecting the computed final variable node value(s) to either final, scalar LLRs or final probability vectors; and
determining the one or more bit values or symbol values of the linear block code based on either the final, scalar LLRs or the final probability vectors.

26. The computer readable media of claim 25, wherein each decoding iteration comprises:
updating one or more variable to factor node messages based at least in part on some or all of the one or more trainable parameters;
updating one or more factor nodes based at least in part on some or all of the one or more trainable parameters;
updating one or more factor to variable node messages based at least in part on some or all of the one or more trainable parameters; and
updating one or more variable nodes based at least in part on some or all of the one or more trainable parameters.

* * * * *